US010435112B2

(12) United States Patent
Tetsuka

(10) Patent No.: US 10,435,112 B2
(45) Date of Patent: Oct. 8, 2019

(54) BICYCLE DRIVE TRAIN

(71) Applicant: SHIMANO INC., Sakai (JP)

(72) Inventor: Toshio Tetsuka, Sakai (JP)

(73) Assignee: SHIMANO INC., Sakai (JP)

(*) Notice: Subject to any disclaimer, the term of this patent is extended or adjusted under 35 U.S.C. 154(b) by 119 days.

(21) Appl. No.: 15/481,465

(22) Filed: Apr. 7, 2017

(65) Prior Publication Data

US 2018/0290713 A1 Oct. 11, 2018

(51) Int. Cl.
| | |
|---|---|
| *B62M 9/14* | (2006.01) |
| *B62M 1/36* | (2013.01) |
| *B62M 9/04* | (2006.01) |
| *B62M 9/12* | (2006.01) |
| *B62M 9/16* | (2006.01) |
| *B62M 25/02* | (2006.01) |
| *B62M 25/08* | (2006.01) |

(52) U.S. Cl.
CPC .............. *B62M 9/14* (2013.01); *B62M 1/36* (2013.01); *B62M 9/04* (2013.01); *B62M 9/12* (2013.01); *B62M 9/16* (2013.01); *B62M 25/02* (2013.01); *B62M 25/08* (2013.01)

(58) Field of Classification Search
CPC . B62M 9/14; B62M 9/04; B62M 1/36; B62M 3/00; B62M 9/10
USPC .......................................................... 474/78
See application file for complete search history.

(56) References Cited

U.S. PATENT DOCUMENTS

| | | | | |
|---|---|---|---|---|
| 3,769,848 | A * | 11/1973 | McGuire ................... | B62M 9/14 474/70 |
| 4,127,038 | A * | 11/1978 | Browning ................ | B62M 9/10 280/236 |
| 4,174,642 | A * | 11/1979 | Martin ..................... | F16H 55/30 474/152 |
| 4,580,997 | A * | 4/1986 | Browning ................ | B62M 9/14 474/160 |
| 4,592,738 | A * | 6/1986 | Nagano ..................... | B62M 9/14 474/162 |
| 5,073,152 | A * | 12/1991 | Browning ............... | B62M 9/125 474/162 |
| 5,152,720 | A * | 10/1992 | Browning ............ | B62M 9/1242 474/80 |
| 5,205,794 | A * | 4/1993 | Browning ................ | B62M 9/14 474/160 |

(Continued)

FOREIGN PATENT DOCUMENTS

| | | |
|---|---|---|
| DE | 3941119 | 6/1991 |
| JP | 4535958 B2 | 2/2007 |

*Primary Examiner* — Henry Y Liu
(74) *Attorney, Agent, or Firm* — Mori & Ward, LLP

(57) ABSTRACT

A bicycle drive train comprises a sprocket assembly and a floating sprocket. The sprocket assembly comprises a first rotational center axis, a first sprocket, and a second sprocket. The first sprocket includes at least one first sprocket tooth and at least one first axially displaceable tooth with respect to the first rotational center axis. The second sprocket includes at least one second sprocket tooth. The at least one first axially displaceable tooth is displaceable relative to the at least one first sprocket tooth toward the at least one second sprocket tooth. The floating sprocket comprises a second rotational center axis and an axially sliding surface. The axially sliding surface is to support the floating sprocket movably relative to the sprocket assembly in an axial direction with respect to the second rotational center axis.

29 Claims, 27 Drawing Sheets

(56) References Cited

U.S. PATENT DOCUMENTS

| | | | | |
|---|---|---|---|---|
| 5,354,243 | A * | 10/1994 | Kriek | B62M 9/14 474/135 |
| 5,480,356 | A * | 1/1996 | Campagnolo | B62M 9/122 280/238 |
| 5,865,062 | A * | 2/1999 | Lahat | B62M 25/045 474/81 |
| 6,173,982 | B1 * | 1/2001 | Westergard | B62M 9/085 280/261 |
| 6,361,461 | B1 * | 3/2002 | Pusic | B62M 9/085 192/64 |
| 6,623,389 | B1 * | 9/2003 | Campagnolo | B62M 9/122 474/70 |
| 7,258,637 | B2 * | 8/2007 | Thomasberg | B62M 9/14 474/160 |
| 7,294,076 | B2 * | 11/2007 | Matsumoto | B62K 25/28 474/160 |
| 7,381,143 | B2 * | 6/2008 | Matsumoto | B62M 9/04 474/78 |
| 7,503,862 | B2 * | 3/2009 | Kaga | B62M 9/04 474/78 |
| 7,520,831 | B2 * | 4/2009 | Kaga | B62J 13/04 474/144 |
| 7,611,430 | B2 * | 11/2009 | Matsumoto | B62M 9/00 474/80 |
| 7,621,834 | B2 * | 11/2009 | Kaga | B62M 9/04 192/64 |
| 8,371,974 | B2 * | 2/2013 | Morita | B62M 9/16 280/261 |
| 8,944,945 | B2 * | 2/2015 | Kilshaw | B62J 13/00 474/78 |
| 9,086,138 | B1 * | 7/2015 | Emura | B62M 9/105 |
| 9,499,233 | B2 * | 11/2016 | Schuster | B62M 9/08 |
| 9,725,132 | B2 * | 8/2017 | Hara | B62M 1/36 |
| 9,776,685 | B2 * | 10/2017 | Tachibana | B62M 3/00 |
| 10,005,520 | B2 * | 6/2018 | Hara | B62M 9/14 |
| 10,066,673 | B2 * | 9/2018 | Hara | B62M 1/36 |
| 10,150,533 | B1 * | 12/2018 | Hara | B62M 1/36 |
| 2004/0130120 | A1 * | 7/2004 | Matsumoto | B62J 13/04 280/260 |
| 2005/0173889 | A1 * | 8/2005 | Matsumoto | B62M 11/145 280/260 |
| 2005/0176535 | A1 * | 8/2005 | Matsumoto | B62M 9/10 474/78 |
| 2005/0176537 | A1 * | 8/2005 | Matsumoto | B62M 9/121 474/80 |
| 2005/0215367 | A1 * | 9/2005 | Thomasberg | B62M 9/14 474/78 |
| 2006/0046881 | A1 * | 3/2006 | Matsumoto | B62M 9/04 474/81 |
| 2006/0058132 | A1 * | 3/2006 | Kaga | B62J 13/04 474/78 |
| 2006/0068954 | A1 * | 3/2006 | Kaga | B62M 9/04 474/74 |
| 2006/0068956 | A1 * | 3/2006 | Matsumoto | B62M 9/00 474/80 |
| 2006/0073925 | A1 * | 4/2006 | Kaga | B62M 9/04 474/78 |
| 2006/0240919 | A1 * | 10/2006 | Matsumoto | B62M 9/04 474/78 |
| 2013/0008282 | A1 * | 1/2013 | Johnson | B62M 3/00 74/594.2 |
| 2014/0248982 | A1 * | 9/2014 | Schuster | B62M 9/08 474/69 |
| 2015/0198231 | A1 * | 7/2015 | Emura | B62M 9/105 474/156 |
| 2015/0274253 | A1 * | 10/2015 | Hara | B62M 1/36 74/594.2 |
| 2017/0233037 | A1 * | 8/2017 | Hara | B62M 9/14 474/78 |

* cited by examiner

BICYCLE DRIVE TRAIN

BACKGROUND OF THE INVENTION

Field of the Invention

The present invention relates to a bicycle drive train.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a drive train.

SUMMARY OF THE INVENTION

In accordance with a first aspect of the present invention, a bicycle drive train comprises a sprocket assembly and a floating sprocket. The sprocket assembly comprises a first rotational center axis, a first sprocket, and a second sprocket. The first sprocket includes at least one first sprocket tooth and at least one first axially displaceable tooth with respect to the first rotational center axis. The second sprocket includes at least one second sprocket tooth. The at least one first axially displaceable tooth is displaceable relative to the at least one first sprocket tooth toward the at least one second sprocket tooth. The floating sprocket comprises a second rotational center axis and an axially sliding surface. The second rotational center axis is offset from the first rotational center axis. One of the first rotational center axis and the second rotational center axis is coincident with a rotational center axis of a bicycle rear hub assembly in a state where the bicycle drive train is mounted to a bicycle body. The axially sliding surface is to support the floating sprocket movably relative to the sprocket assembly in an axial direction with respect to the second rotational center axis.

With the bicycle drive train according to the first aspect, the floating sprocket smoothens a shift operation of a bicycle chain even when the first sprocket includes the at least one first axially displaceable tooth.

In accordance with a second aspect of the present invention, the bicycle drive train according to the first aspect is configured so that the at least one first axially displaceable tooth is pivotally displaceable about a first pivot axis relative to the at least one first sprocket tooth toward the at least one second sprocket tooth.

With the bicycle drive train according to the second aspect, it is possible to simplify the structure of the first sprocket.

In accordance with a third aspect of the present invention, the bicycle drive train according to the first or second aspect further comprises an actuator configured to move the at least one first axially displaceable tooth relative to the at least one first sprocket tooth.

With the bicycle drive train according to the third aspect, it is possible to remotely move the at least one first axially displaceable tooth relative to the at least one first sprocket.

In accordance with a fourth aspect of the present invention, the bicycle drive train according to the third aspect is configured so that the actuator includes an electric motor.

With the bicycle drive train according to the fourth aspect, it is possible to improve convenience of the bicycle drive train.

In accordance with a fifth aspect of the present invention, the bicycle drive train according to any one of the first to fourth aspects further comprises a chain tensioner to apply tension to a first chain coupling the sprocket assembly and the floating sprocket to transmit a rotational force between the sprocket assembly and the floating sprocket.

With the bicycle drive train according to the fifth aspect, it is possible to reduce sag of the first chain.

In accordance with a sixth aspect of the present invention, the bicycle drive train according to the fifth aspect is configured so that the chain tensioner is movable relative to the sprocket assembly in the axial direction.

With the bicycle drive train according to the sixth aspect, it is possible to reduce sag of the first chain while the chain tensioner follows a movement of the floating sprocket.

In accordance with a seventh aspect of the present invention, the bicycle drive train according to any one of the first to sixth aspects is configured so that the floating sprocket is a rear sprocket.

With the bicycle drive train according to the seventh aspect, the floating sprocket effectively smoothens the shift operation of the bicycle chain even when the first sprocket includes the at least one first axially displaceable tooth.

In accordance with an eighth aspect of the present invention, the bicycle drive train according to any one of the first to seventh aspects further comprises a first chain coupling the sprocket assembly and the floating sprocket to transmit a rotational force between the sprocket assembly and the floating sprocket.

With the bicycle drive train according to the eighth aspect, the floating sprocket effectively smoothens a shift operation of the first chain even when the first sprocket includes the at least one first axially displaceable tooth.

In accordance with a ninth aspect of the present invention, the bicycle drive train according to the eighth aspect is configured so that the first chain includes opposed pairs of link plates defining link spaces adjacent to each other along a longitudinal direction of the first chain without another space between the link spaces. The link spaces have axial widths equal to each other.

With the bicycle drive train according to the ninth aspect, it is possible to improve chain-holding performance of the bicycle drive train.

In accordance with a tenth aspect of the present invention, the bicycle drive train according to any one of the first to ninth aspects further comprises a housing. The sprocket assembly and the floating sprocket are provided in the housing.

With the bicycle drive train according to the tenth aspect, it is possible to protect the sprocket assembly and the floating sprocket from foreign substances and/or water.

In accordance with an eleventh aspect of the present invention, the bicycle drive train according to any one of the first to tenth aspects further comprises a front sprocket assembly including a crank axle and a front sprocket mounted on the crank axle.

With the bicycle drive train according to the eleventh aspect, it is possible to utilize the sprocket assembly and the floating sprocket in combination with the front sprocket assembly.

In accordance with a twelfth aspect of the present invention, the bicycle drive train according to the eleventh aspect is configured so that the front sprocket is a single sprocket mounted to the crank axle.

With the bicycle drive train according to the twelfth aspect, it is possible to simplify the structure of the front sprocket assembly.

In accordance with a thirteenth aspect of the present invention, the bicycle drive train according to the eleventh or twelfth aspect is configured so that the front sprocket includes at least one first front tooth and at least one second front teeth. The at least one first front tooth has a first maximum axial width defined in the axial direction. The at least one second front tooth has a second maximum axial width defined in the axial direction. The first maximum axial width is larger than the second maximum axial width.

With the bicycle drive train according to the thirteenth aspect, it is possible to improve chain-holding performance of the bicycle drive train.

In accordance with a fourteenth aspect of the present invention, the bicycle drive train according to any one of the eleventh to thirteenth aspects further comprises an intermediate sprocket coupled to the front sprocket with a second chain to transmit a rotational force between the intermediate sprocket and the front sprocket.

With the bicycle drive train according to the fourteenth aspect, it is possible to improve design freedom of the bicycle drive train.

In accordance with a fifteenth aspect of the present invention, the bicycle drive train according to the fourteenth aspect further comprises the second chain coupling the intermediate sprocket and the front sprocket to transmit the rotational force between the intermediate sprocket and the front sprocket.

With the bicycle drive train according to the fifteenth aspect, it is possible to certainly transmit the rotational force between the intermediate sprocket and the front sprocket.

In accordance with a sixteenth aspect of the present invention, the bicycle drive train according to the fourteenth or fifteenth aspect is configured so that the second chain includes opposed pairs of link plates defining link spaces adjacent to each other along a longitudinal direction of the second chain without another space between the link spaces. The link spaces have axial widths equal to each other.

With the bicycle drive train according to the sixteenth aspect, it is possible to improve chain-holding performance of the bicycle drive train.

In accordance with a seventeenth aspect of the present invention, the bicycle drive train according to any one of the fourteenth to sixteenth aspects further comprises a one-way clutch coupling the intermediate sprocket to the first sprocket and the second sprocket such that the intermediate sprocket is rotatable relative to the first sprocket and second sprocket only in one rotational direction.

With the bicycle drive train according to the seventeenth aspect, it is possible to prevent a reverse rotational force from being transmitted from the intermediate sprocket to the front sprocket during coasting.

In accordance with an eighteenth aspect of the present invention, the bicycle drive train according to any one of the first to tenth aspects is configured so that the sprocket assembly includes a crank axle defining the first rotational center axis. The first sprocket and the second sprocket are mounted on the crank axle.

With the bicycle drive train according to the eighteenth aspect, it is possible to utilize the sprocket assembly as a front sprocket assembly.

In accordance with a nineteenth aspect of the present invention, the bicycle drive train according to any one of the first to eighteenth aspects is configured so that the at least one first sprocket tooth includes at least one first wide tooth and at least one first narrow tooth. The at least one first wide tooth has a first maximum width defined in the axial direction. The at least one first narrow tooth has a first additional maximum width defined in the axial direction. The first maximum width is larger than the first additional maximum width.

With the bicycle drive train according to the nineteenth aspect, it is possible to improve chain-holding performance of the bicycle drive train.

In accordance with a twentieth aspect of the present invention, the bicycle drive train according to any one of the first to nineteenth aspects is configured so that the at least one second sprocket tooth includes at least one second wide tooth and at least one second narrow tooth. The at least one second wide tooth has a second maximum width defined in the axial direction. The at least one second narrow tooth has a second additional maximum width defined in the axial direction. The second maximum width is larger than the second additional maximum width.

With the bicycle drive train according to the twentieth aspect, it is possible to further improve chain-holding performance of the bicycle drive train.

In accordance with a twenty-first aspect of the present invention, the bicycle drive train according to any one of the first to sixth aspects is configured so that the sprocket assembly is a rear sprocket assembly.

With the bicycle drive train according to the twenty-first aspect, it is possible to utilize the sprocket assembly as the rear sprocket assembly.

In accordance with a twenty-second aspect of the present invention, the bicycle drive train according to the twenty-first aspect further comprises a front sprocket assembly including a crank axle and a front sprocket mounted on the crank axle.

With the bicycle drive train according to the twenty-second aspect, it is possible to utilize the sprocket assembly and the floating sprocket in combination with the front sprocket assembly.

In accordance with a twenty-third aspect of the present invention, the bicycle drive train according to the twenty-second aspect further comprises an intermediate sprocket coupled to the front sprocket with a second chain to transmit a rotational force between the intermediate sprocket and the front sprocket. The intermediate sprocket is coupled to the floating sprocket rotatable about the second rotational center axis.

With the bicycle drive train according to the twenty-third aspect, it is possible to make the structure of the floating sprocket and the intermediate sprocket compact.

In accordance with a twenty-fourth aspect of the present invention, the bicycle drive train according to the twenty-third aspect further comprises a one-way clutch coupling the intermediate sprocket to the first sprocket and the second sprocket to be rotatable relative to the first sprocket and second sprocket only in one rotational direction.

With the bicycle drive train according to the twenty-fourth aspect, it is possible to prevent a reverse rotational force from being transmitted from the intermediate sprocket to the front sprocket during coasting.

In accordance with a twenty-fifth aspect of the present invention, the bicycle drive train according to any one of the first to tenth aspects is configured so that the floating sprocket is a front sprocket.

With the bicycle drive train according to the twenty-fifth aspect, it is possible to utilize the floating sprocket as the front sprocket.

In accordance with a twenty-sixth aspect of the present invention, the bicycle drive train according to the twenty-fifth aspect is configured so that the sprocket assembly is a rear sprocket assembly.

With the bicycle drive train according to the twenty-sixth aspect, it is possible to utilize the sprocket assembly as the rear sprocket assembly.

In accordance with a twenty-seventh aspect of the present invention, the bicycle drive train according to the first or second aspect further comprises an actuator configured to move the first axially displaceable tooth relative to the at least one first sprocket tooth in response to a movement of a mechanical control cable. The actuator includes a cable attachment part to receive movement of the mechanical control cable.

With the bicycle drive train according to the twenty-seventh aspect, it is possible to remotely move the at least one first axially displaceable tooth relative to the at least one first sprocket using the mechanical control cable.

In accordance with a twenty-eighth aspect of the present invention, the bicycle drive train according to the first or second aspect further comprises an actuator including a solenoid configured to move the first axially displaceable tooth relative to the at least one first sprocket tooth.

With the bicycle drive train according to the twenty-eighth aspect, it is possible to remotely move the at least one first axially displaceable tooth relative to the at least one first sprocket using the solenoid.

In accordance with a twenty-ninth aspect of the present invention, a bicycle drive train comprises a sprocket assembly. The sprocket assembly comprises a first rotational center axis, a first sprocket, and a second sprocket. The first sprocket includes at least one first sprocket tooth and at least one first axially displaceable tooth with respect to a rotational center axis of the first sprocket. The at least one first sprocket tooth includes at least one first wide tooth and at least one first narrow tooth. The at least one first wide tooth has a first maximum width defined in the axial direction. The at least one first narrow tooth has a first additional maximum width defined in the axial direction. The first maximum width is larger than the first additional maximum width. The second sprocket includes at least one second sprocket tooth. The at least one first axially displaceable tooth is displaceable relative to the at least one first sprocket tooth toward the at least one second sprocket tooth.

With the bicycle drive train according to the twenty-ninth aspect, it is possible to improve chain-holding performance with smoothening a shifting operation of a bicycle chain.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
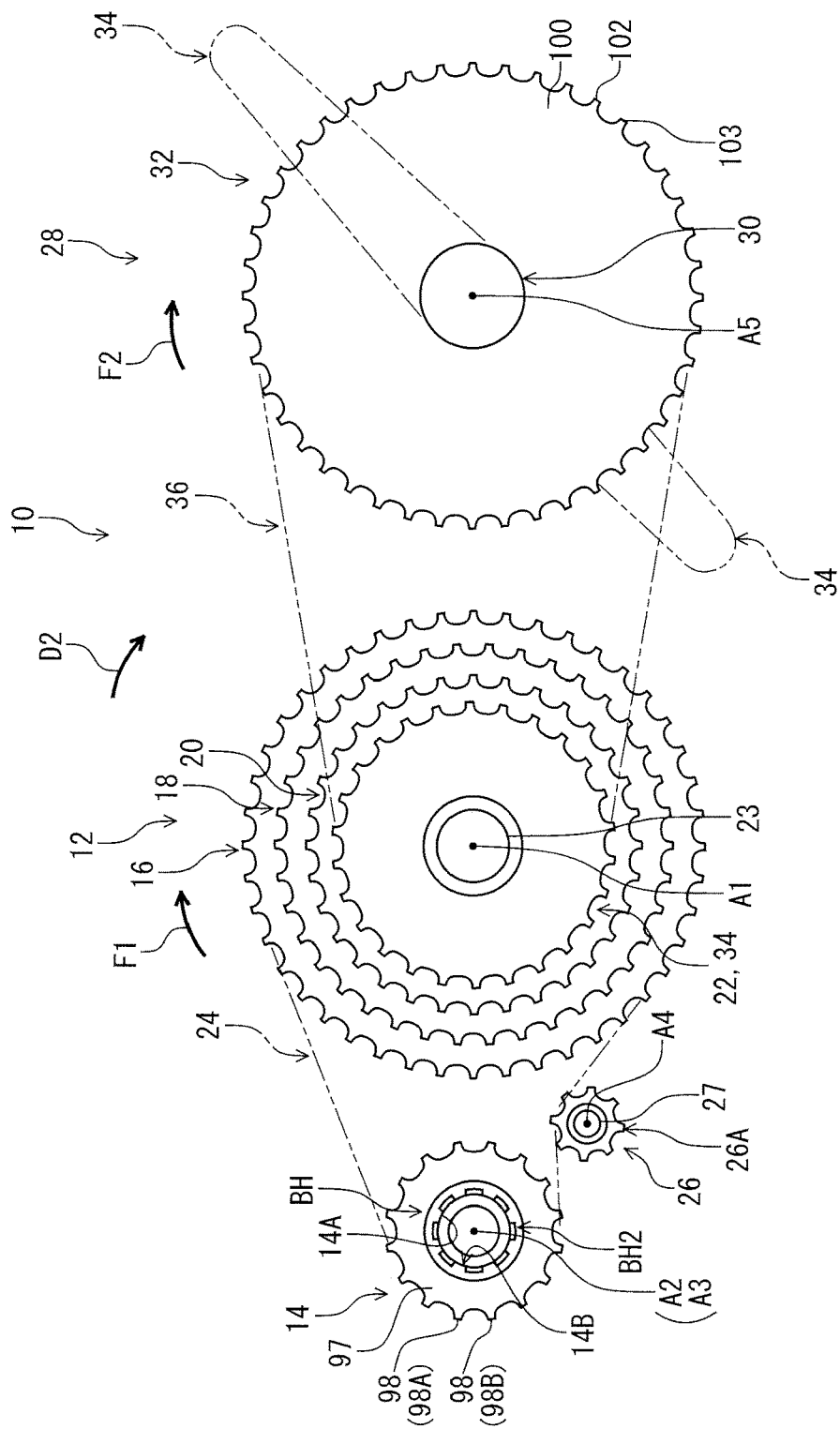
FIG. 1 is a schematic side elevational view of a bicycle drive train in accordance with a first embodiment.

The embodiment(s) will now be described with reference to the accompanying drawings, wherein like reference numerals designate corresponding or identical elements throughout the various drawings.

First Embodiment

Figure 2:
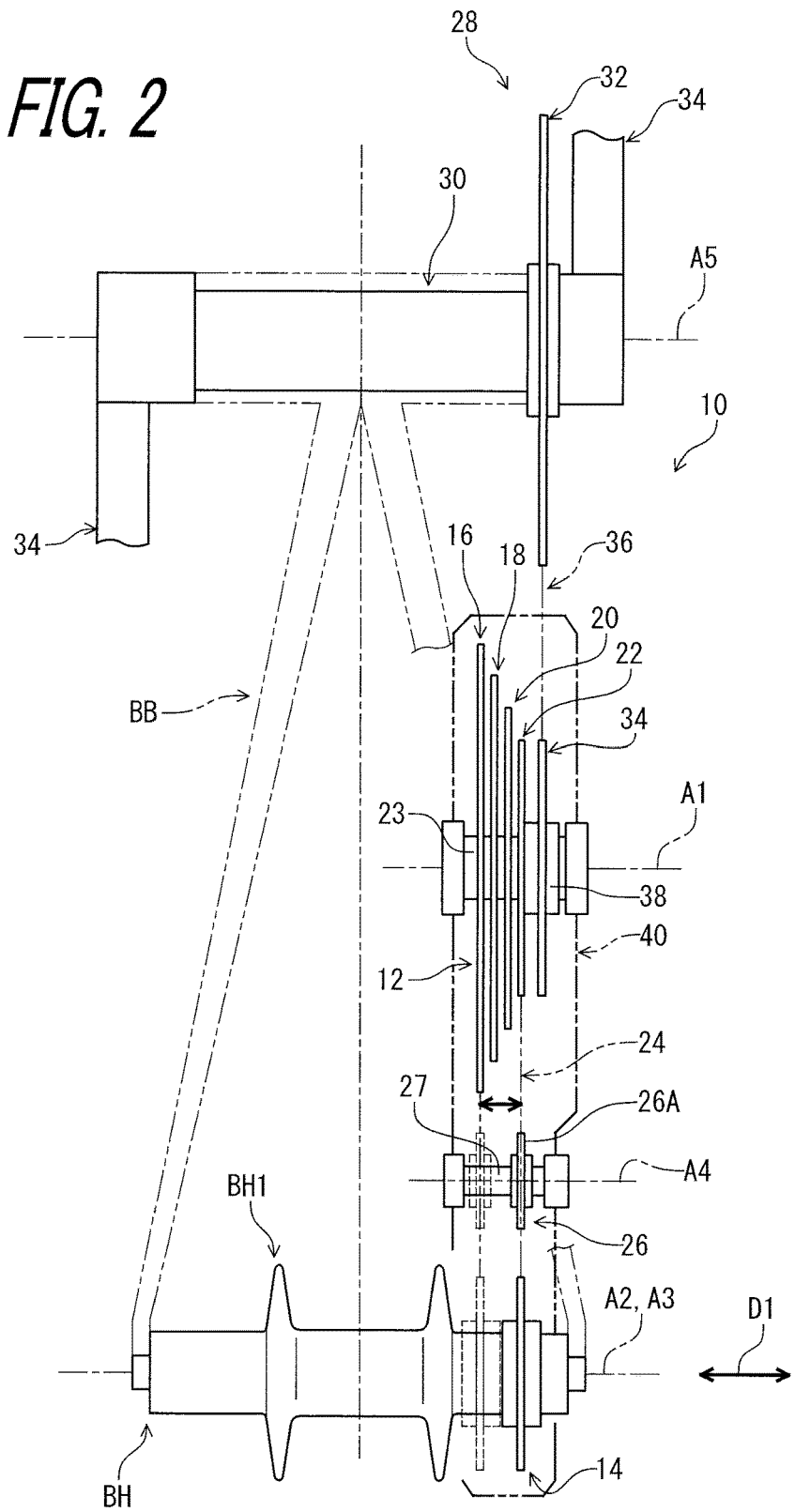
FIG. 2 is a schematic plan view of the bicycle drive train illustrated in FIG. 1.

Referring initially to FIGS. 1 and 2, a bicycle drive train 10 in accordance with a first embodiment comprises a sprocket assembly 12 and a floating sprocket 14. The sprocket assembly 12 comprises a first rotational center axis A1, a first sprocket 16, and a second sprocket 18. In this embodiment, the sprocket assembly 12 comprises a third sprocket 20 and a fourth sprocket 22. However, a total number of sprockets of the sprocket assembly 12 is not limited to this embodiment. In this embodiment, the first sprocket 16 has the largest pitch-circle diameter among the first to fourth sprockets 16 to 22. The fourth sprocket 22 has the smaller pitch-circle diameter among the first to fourth sprockets 16 to 22. The first to fourth sprockets 16 to 22 are rotatably supported on a sprocket support shaft 23.

The floating sprocket 14 comprises a second rotational center axis A2 offset from the first rotational center axis A1. One of the first rotational center axis A1 and the second rotational center axis A2 is coincident with a rotational center axis A3 of a bicycle rear hub assembly BH (FIG. 2) in a state where the bicycle drive train 10 is mounted to a bicycle body BB (FIG. 2). In this embodiment, the second rotational center axis A2 is coincident with the rotational center axis A3 of the bicycle rear hub assembly BH in the state where the bicycle drive train 10 is mounted to the bicycle body BB. The floating sprocket 14 is a rear sprocket.

The bicycle drive train 10 further comprises a first chain 24. The first chain 24 couples the sprocket assembly 12 and the front to transmit a rotational force F1 between the sprocket assembly 12 and the floating sprocket 14. The bicycle drive train 10 further comprises a chain tensioner 26 to apply tension to the first chain 24. The chain tensioner 26 includes a pulley 26A and a tensioner support 27. The pulley 26A is engaged with the first chain 24. The pulley 26A is rotatably mounted on the tensioner support 27 about a tensioner rotational center axis A4. The chain tensioner 26 includes a tension biasing member (not shown) to bias the pulley 26A toward the first chain 24.

As seen in FIG. 1, the floating sprocket 14 comprises an axially sliding surface 14A to support the floating sprocket 14 movably relative to the sprocket assembly 12 in an axial direction D1 with respect to the second rotational center axis A2. In this embodiment, the floating sprocket 14 is movably mounted on the bicycle rear hub assembly BH. The floating sprocket 14 includes an inner splined portion 14B provided on the axially sliding surface 14A. The bicycle rear hub assembly BH includes an outer splined portion BH2 engaged with the inner splined portion 14B. Thus, the floating sprocket 14 is movable relative to the bicycle rear hub assembly BH in the axial direction D1 with respect to the second rotational center axis A2. The floating sprocket 14 is integrally rotatable with a hub shell BH1 of the bicycle rear hub assembly BH. A rim (not shown) is coupled to the hub shell BH1 with spokes (not shown).

The chain tensioner 26 is movable relative to the sprocket assembly 12 in the axial direction D1. In this embodiment, the chain tensioner 26 is movably mounted on a tensioner support 27 in the axial direction D1. The chain tensioner 26 is rotatably mounted on the tensioner support 27.

As seen in FIGS. 1 and 2, the bicycle drive train 10 further comprises a front sprocket assembly 28. The front sprocket assembly 28 includes a crank axle 30 and a front sprocket 32 mounted on the crank axle 30. The front sprocket 32 is a single sprocket mounted to the crank axle 30. The front sprocket assembly 28 comprises a front rotational center axis A5 offset from the first rotational center axis A1 and the second rotational center axis A2. The front sprocket assembly 28 includes crank arms 34 secured to the crank axle 30.

The bicycle drive train 10 further comprises an intermediate sprocket 34 coupled to the front sprocket 32 with a second chain 36 to transmit a rotational force F2 between the intermediate sprocket 34 and the front sprocket 32. In this embodiment, the intermediate sprocket 34 has substantially the same structure as that of the fourth sprocket 22. However, the intermediate sprocket 34 can have a structure different from that of the fourth sprocket 22.

The bicycle drive train 10 further comprises the second chain 36. The second chain 36 couples the intermediate sprocket 34 and the front sprocket 32 to transmit the rotational force F2 between the intermediate sprocket 34 and the front sprocket 32. Thus, a pedaling force is transmitted from the front sprocket assembly 28 to the front through the second chain 36, the sprocket assembly 12, and the first chain 24.

As seen in FIG. 2, the bicycle drive train 10 further comprises a one-way clutch 38. The one-way clutch 38 couples the intermediate sprocket 34 to the first sprocket 16 and the second sprocket 18 such that the intermediate sprocket 34 is rotatable relative to the first sprocket 16 and second sprocket 18 only in one rotational direction. The first to fourth sprockets 16 to 22 are rotatable relative to the intermediate sprocket 34 in a first rotational direction D2 even when the front sprocket assembly 28 and the intermediate sprocket 34 stop rotating.

As seen in FIG. 2, the bicycle drive train 10 further comprises a housing 40. The sprocket assembly 12 and the floating sprocket 14 are provided in the housing 40. The housing 40 is secured to the bicycle body BB. However, the housing 40 can be omitted from the bicycle drive train 10. The sprocket support shaft 23 and the tensioner support 27 are mounted on the housing 40.

Figure 3:
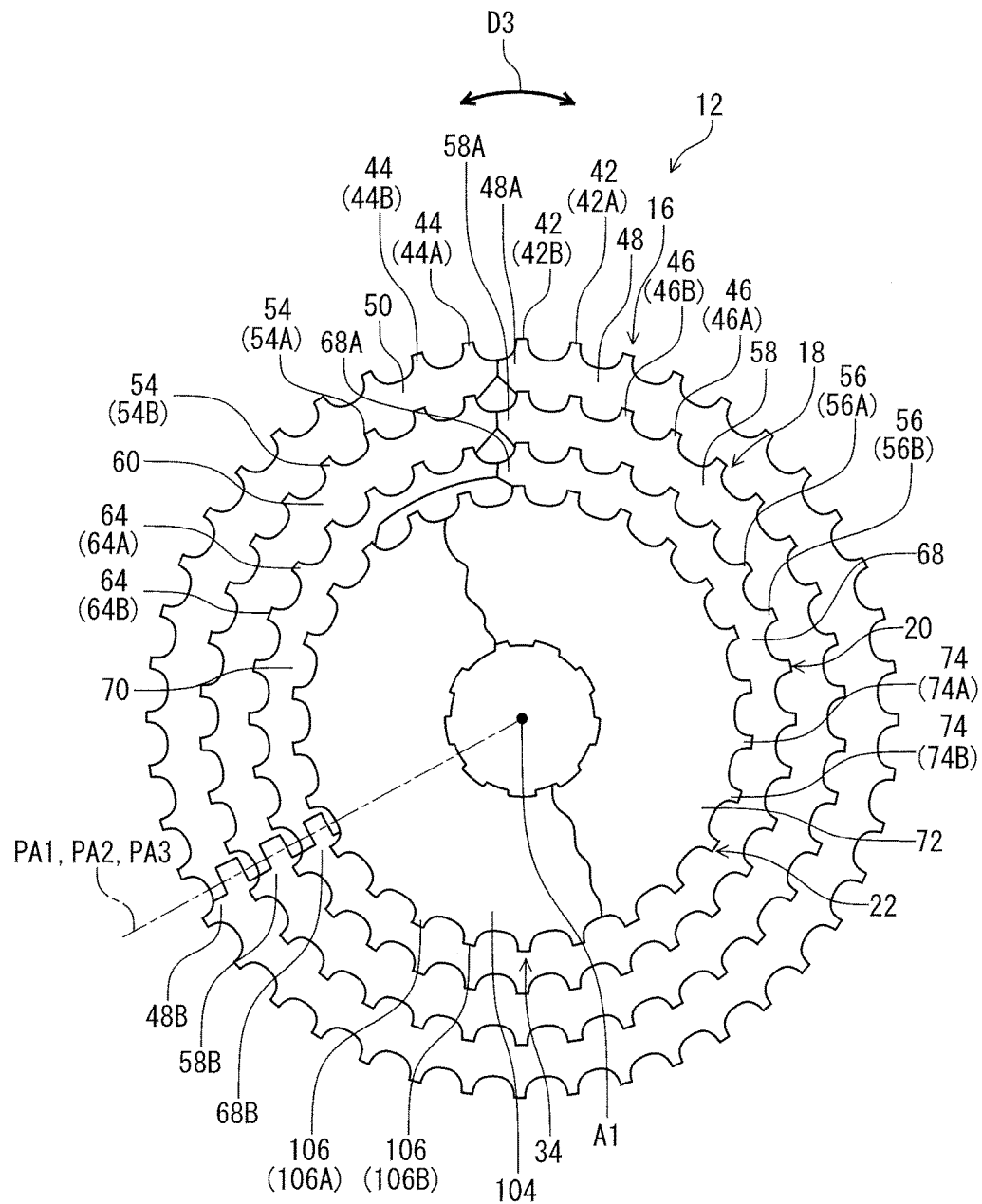
FIG. 3 is a schematic side elevational view of a sprocket assembly of the bicycle drive train illustrated in FIG. 1.
Figure 4:
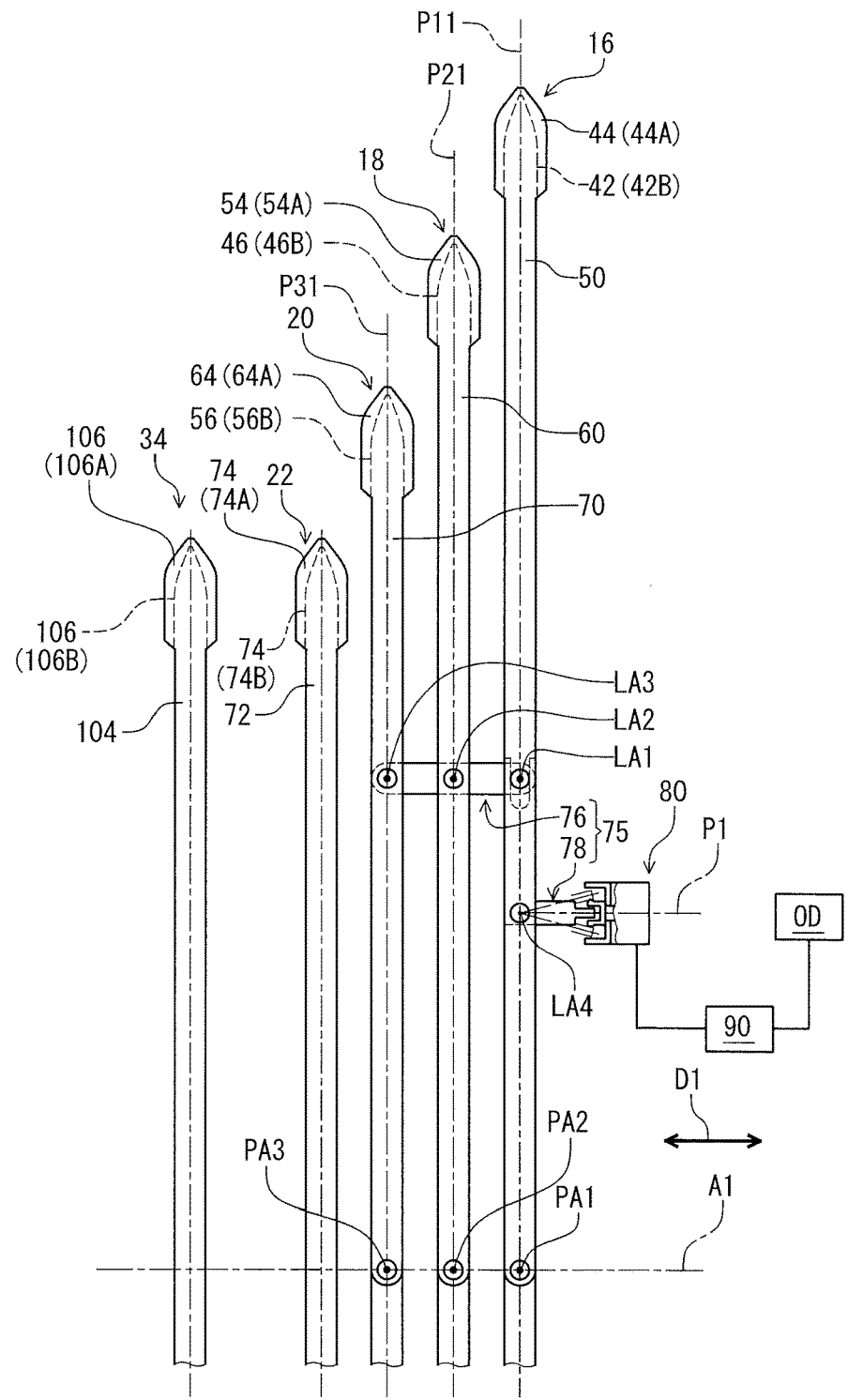
FIG. 4 is another schematic side elevational view of the sprocket assembly of the bicycle drive train illustrated in FIG. 1 (rest position).
Figure 5:
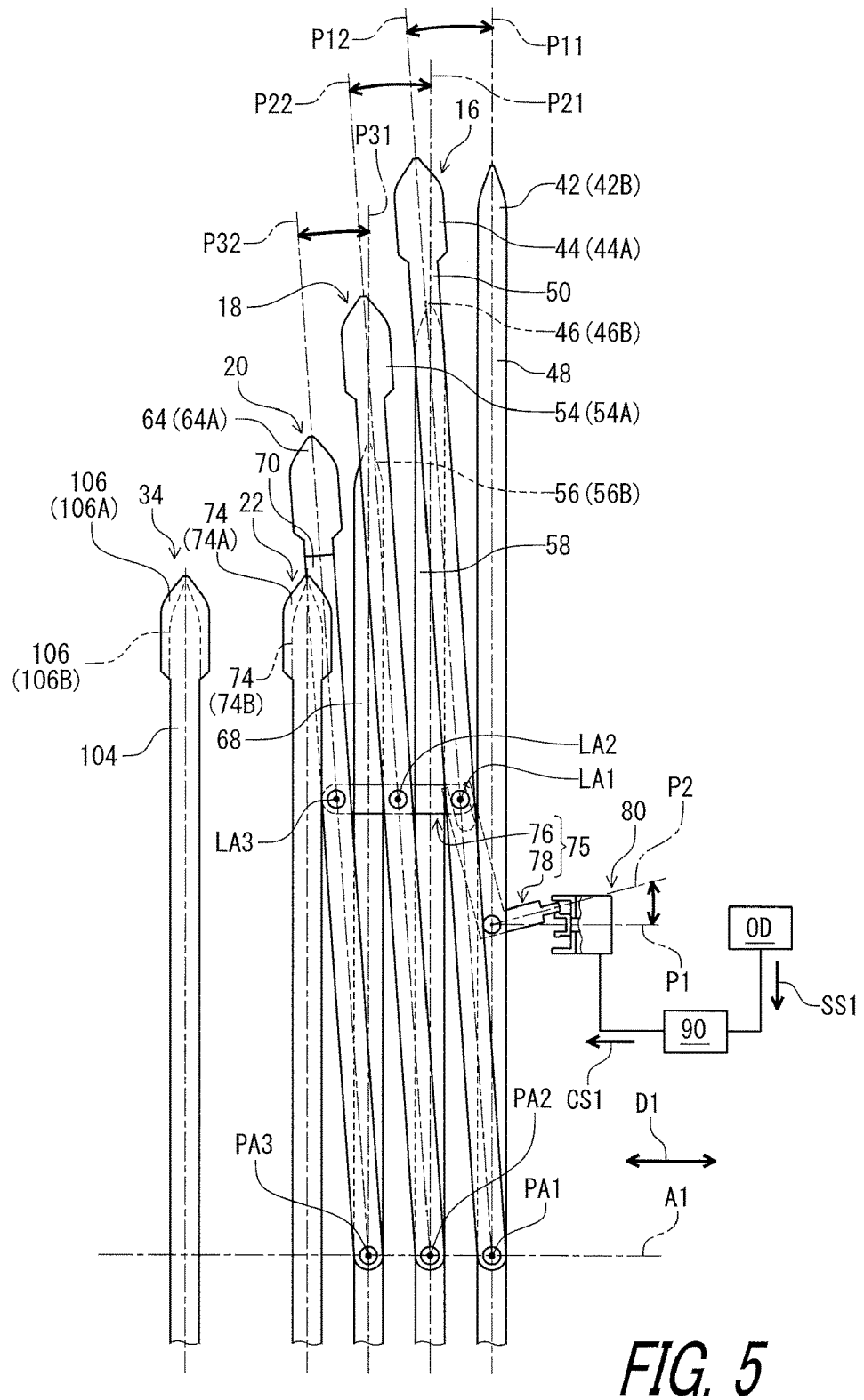
FIG. 5 is another schematic side elevational view of the sprocket assembly of the bicycle drive train illustrated in FIG. 1 (first operated position).

As seen in FIGS. 3 and 4, the first sprocket 16 includes at least one first sprocket tooth 42 and at least one first axially displaceable tooth 44 with respect to the first rotational center axis A1. The second sprocket 18 includes at least one second sprocket tooth 46. As seen in FIGS. 4 and 5, the at least one first axially displaceable tooth 44 is displaceable relative to the at least one first sprocket tooth 42 toward the at least one second sprocket tooth 46.

In this embodiment, as seen in FIG. 3, the first sprocket 16 includes a plurality of first sprocket teeth 42 and a plurality of first axially displaceable teeth 44. The first sprocket 16 includes a first sprocket body 48 and a first movable body 50. The first sprocket tooth 42 extends radially outwardly from the first sprocket body 48. The first axially displaceable tooth 44 extends radially outwardly from the first movable body 50. The first sprocket body 48 includes a first circumferential end 48A and a first additional circumferential end 48B. The first movable body 50 is provided between the first circumferential end 48A and the first additional circumferential end 48B in a circumferential direction D3 of the sprocket assembly 12.

Figure 6:
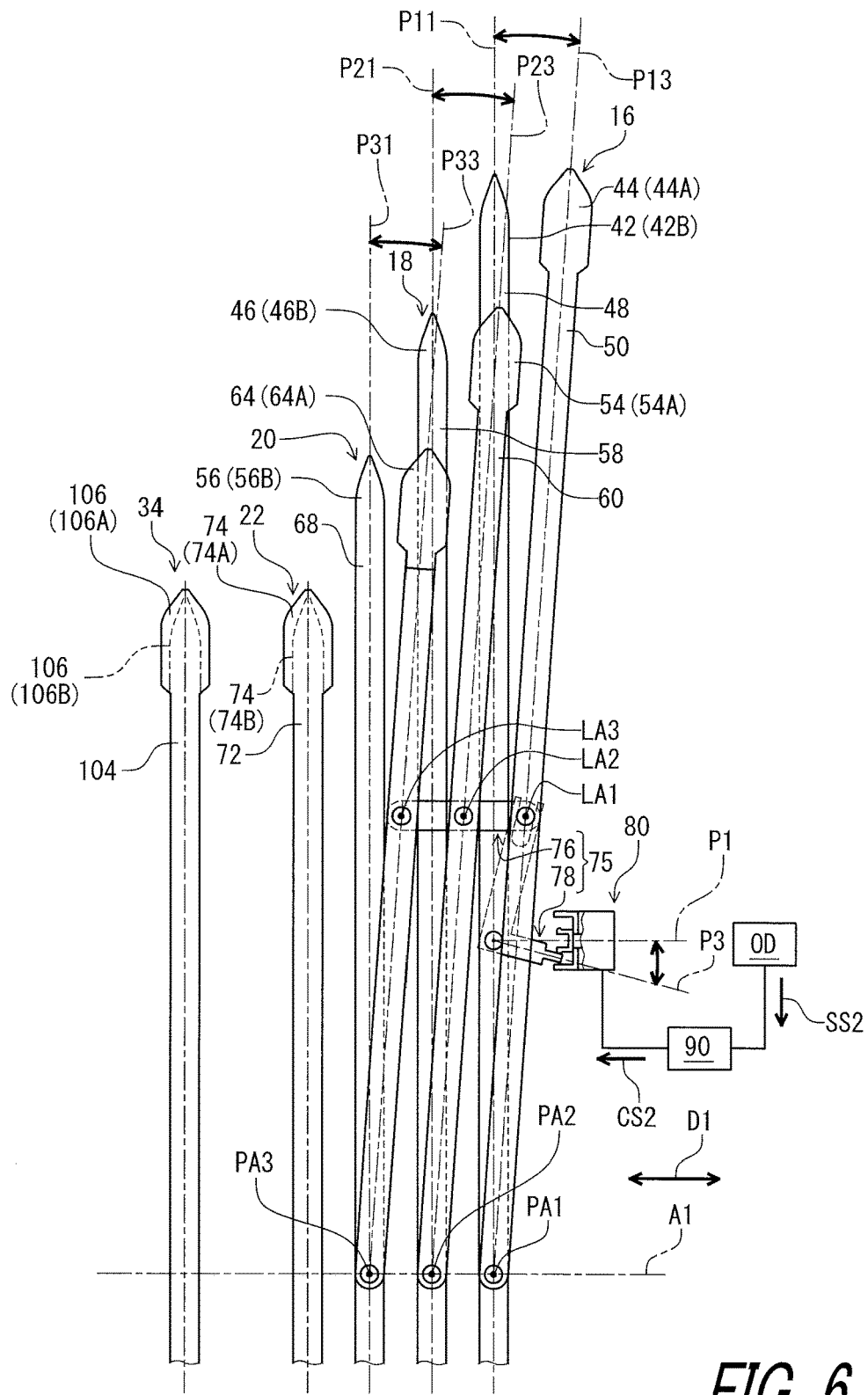
FIG. 6 is another schematic side elevational view of the sprocket assembly of the bicycle drive train illustrated in FIG. 1 (second operated position).

As seen in FIGS. 4 and 5, the at least one first axially displaceable tooth 44 is pivotally displaceable about a first pivot axis PA1 relative to the at least one first sprocket tooth 42 toward the at least one second sprocket tooth 46. In this embodiment, the first movable body 50 is pivotally coupled to the first additional circumferential end 48B of the first sprocket body 48 about the first pivot axis PA1. The plurality of first axially displaceable teeth 44 is pivotally displaceable about the first pivot axis PA1 relative to the plurality of first sprocket teeth 42 toward the plurality of second sprocket teeth 46. As seen in FIG. 6, the plurality of first axially displaceable teeth 44 is pivotally displaceable about the first pivot axis PA1 relative to the plurality of first sprocket teeth 42 away from the plurality of second sprocket teeth 46. As seen in FIG. 3, the first pivot axis PA1 extends radially outwardly from the first rotational center axis A1.

As seen in FIGS. 3 and 4, the second sprocket 18 includes at least one second axially displaceable tooth 54 with respect to the first rotational center axis A1. The third sprocket 20 includes at least one third sprocket tooth 56. As seen in FIGS. 4 and 5, the at least one second axially displaceable tooth 54 is displaceable relative to the at least one second sprocket tooth 46 toward the at least one third sprocket tooth 56.

In this embodiment, as seen in FIG. 3, the second sprocket 18 includes a plurality of second sprocket teeth 46 and a plurality of second axially displaceable teeth 54. The second sprocket 18 includes a second sprocket body 58 and a second movable body 60. The second sprocket tooth 46 extends radially outwardly from the second sprocket body 58. The second axially displaceable tooth 54 extends radially outwardly from the second movable body 60. The second sprocket body 58 includes a second circumferential end 58A and a second additional circumferential end 58B. The second movable body 60 is provided between the second circumferential end 58A and the second additional circumferential end 58B in the circumferential direction D3 of the sprocket assembly 12.

As seen in FIGS. 4 and 5, the at least one second axially displaceable tooth 54 is pivotally displaceable about a second pivot axis PA2 relative to the at least one second sprocket tooth 46 toward the at least one third sprocket tooth 56. In this embodiment, the second movable body 60 is pivotally coupled to the second additional circumferential end 58B of the second sprocket body 58 about the second pivot axis PA2. The plurality of second axially displaceable teeth 54 is pivotally displaceable about the second pivot axis PA2 relative to the plurality of second sprocket teeth 46 toward the plurality of third sprocket teeth 56. As seen in FIG. 6, the plurality of second axially displaceable teeth 54 is pivotally displaceable about the second pivot axis PA2 relative to the plurality of second sprocket teeth 46 away from the plurality of third sprocket teeth 56. As seen in FIG. 3, the second pivot axis PA2 extends radially outwardly from the second rotational center axis A2.

As seen in FIGS. 3 and 4, the third sprocket 20 includes at least one third axially displaceable tooth 64 with respect to the first rotational center axis A1. The fourth sprocket 22 includes at least one fourth sprocket tooth 74. As seen in FIGS. 4 and 5, the at least one third axially displaceable tooth 64 is displaceable relative to the at least one third sprocket tooth 56 toward the at least one fourth sprocket tooth 74.

In this embodiment, as seen in FIG. 3, the third sprocket 20 includes a plurality of third sprocket teeth 56 and a plurality of third axially displaceable teeth 64. The third sprocket 20 includes a third sprocket body 68 and a third movable body 70. The third sprocket tooth 56 extends radially outwardly from the third sprocket body 68. The third axially displaceable tooth 64 extends radially outwardly from the third movable body 70. The third sprocket body 68 includes a third circumferential end 68A and a third additional circumferential end 68B. The third movable body 70 is provided between the third circumferential end 68A and the third additional circumferential end 68B in the circumferential direction D3 of the sprocket assembly 12.

As seen in FIGS. 4 and 5, the at least one third axially displaceable tooth 64 is pivotally displaceable about a third pivot axis PA3 relative to the at least one third sprocket tooth 56 toward the at least one fourth sprocket tooth 74. In this embodiment, the third movable body 70 is pivotally coupled to the third additional circumferential end 68B of the third sprocket body 68 about the third pivot axis PA3. The plurality of third axially displaceable teeth 64 is pivotally displaceable about the third pivot axis PA3 relative to the plurality of third sprocket teeth 56 toward the plurality of fourth sprocket teeth 66. As seen in FIG. 6, the plurality of third axially displaceable teeth 64 is pivotally displaceable about the third pivot axis PA3 relative to the plurality of third sprocket teeth 56 away from the plurality of fourth sprocket teeth 66. As seen in FIG. 3, the third pivot axis PA3 extends radially outwardly from the first rotational center axis A1.

As seen in FIG. 3, the fourth sprocket 22 includes a fourth sprocket body 72 and the at least one fourth sprocket tooth 66 extending radially outwardly from the fourth sprocket body 72 In this embodiment, the fourth sprocket 22 includes a plurality of fourth sprocket teeth 66. The fourth sprocket 22 can include at least one fourth axially displaceable tooth and a fourth movable body having substantially the same structures as those of the at least one first axially displaceable tooth 44 and the first movable body 50.

As seen in FIG. 4, the sprocket assembly 12 includes a link structure 75. The link structure 75 operatively couples the first movable body 50, the second movable body 60, and the third movable body 70 to move together. The link structure 75 includes a first link 76 and a second link 78. The first link 76 is pivotally coupled to the first movable body 50 about a first link axis LA1. The first link 76 is pivotally coupled to the second movable body 60 about a second link axis LA2. The first link 76 is pivotally coupled to the third movable body 70 about a third link axis LA3.

As seen in FIGS. 4 to 6, the second link 78 is pivotally coupled to the first sprocket body 48 about a fourth link axis LA4. The second link 78 is pivotally coupled to the first link 74 about the first link axis LA1. The second link 78 is pivotable relative to the first sprocket body 48 about the fourth link axis LA4 among a rest position P1, a first operated position P2, and a second operated position P3. This respectively pivots the first movable body 50, the second movable body 60, and the third movable body 70 relative to the first sprocket body 48, the second sprocket body 58, and the third sprocket body 68 about the first pivot axis PA1, the second pivot axis PA2, and the third pivot axis PA3.

As seen in FIGS. 4 to 6, the first movable body 50 is pivoted from a first rest position P11 to a first displacement position P12 in response to a first pivotal movement of the second link 78 from the rest position P1 to the first operated position P2. The first movable body 50 is pivoted from the first rest position P11 to a first additional displacement position P13 in response to a second pivotal movement of the second link 78 from the rest position P1 to the second operated position P3.

The second movable body 60 is pivoted from a second rest position P21 to a second displacement position P22 in response to the first pivotal movement of the second link 78 from the rest position P1 to the first operated position P2. The second movable body 60 is pivoted from the second rest position P21 to a second additional displacement position P23 in response to the second pivotal movement of the second link 78 from the rest position P1 to the second operated position P3.

The third movable body 70 is pivoted from a third rest position P31 to a third displacement position P32 in response to the first pivotal movement of the second link 78 from the rest position P1 to the first operated position P2. The third movable body 70 is pivoted from the third rest position P31 to a third additional displacement position P33 in response to the second pivotal movement of the second link 78 from the rest position P1 to the second operated position P3.

The link structure 75 includes a biasing member (not shown) to bias the second link 78 to position in the rest position P1. The biasing member includes a coiled spring. Thus, the plurality of first axially displaceable teeth 44 is positioned in the first rest position P11 in a state where the second link 78 is not operated. The plurality of second axially displaceable teeth 54 is positioned in the second rest position P21 in a state where the second link 76 is not operated. The plurality of third axially displaceable teeth 64 is positioned in the first rest position P11 in a state where the second link 76 is not operated.

As seen in FIG. 4, the bicycle drive train 10 further comprises an actuator 80 configured to move the at least one first axially displaceable tooth 44 relative to the at least one first sprocket tooth 42. In this embodiment, the actuator 80 includes an electric motor 82. The actuator 80 is attached to the bicycle body BB (FIG. 2).

Figure 7:
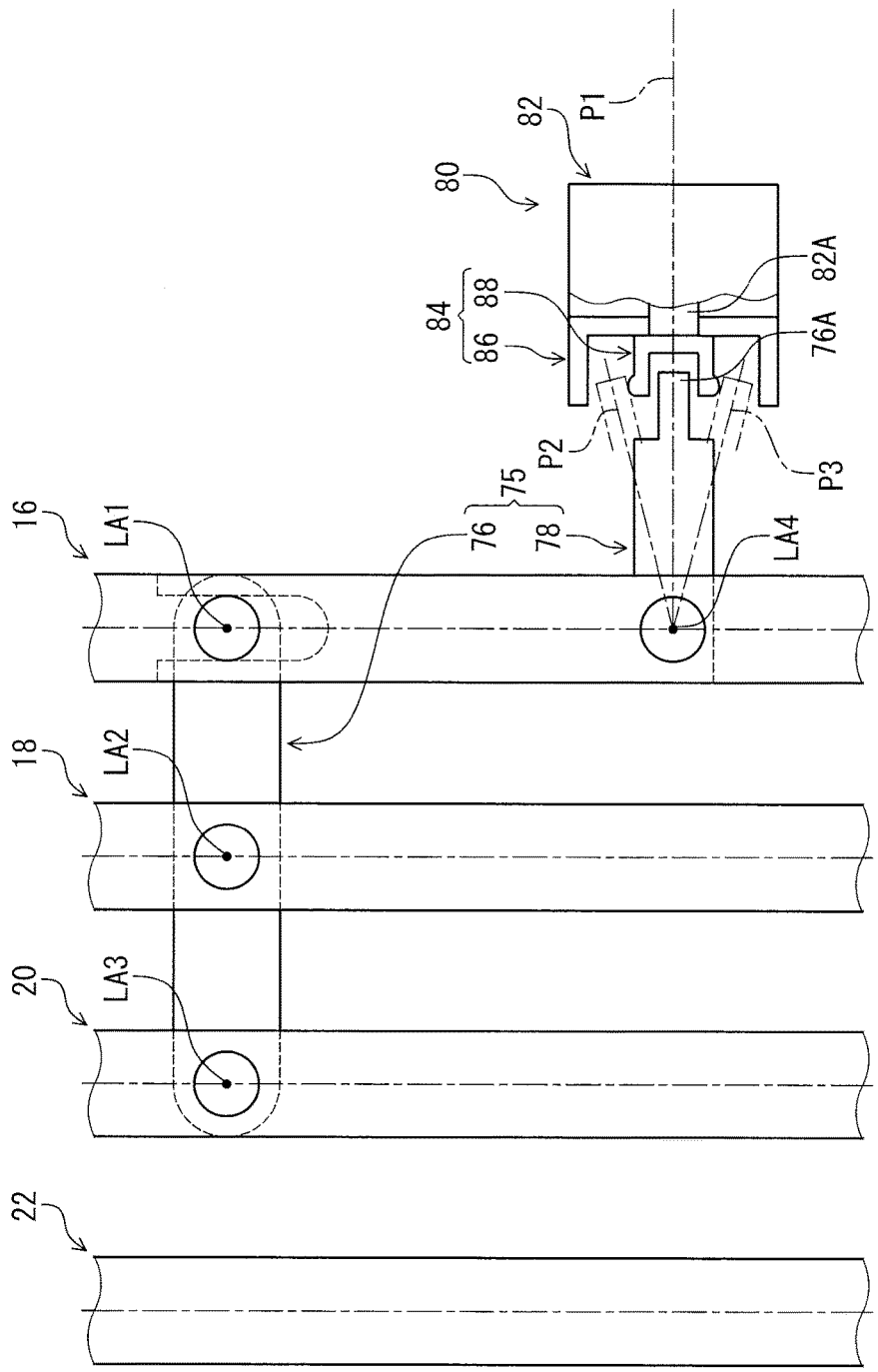
FIG. 7 is an enlarged schematic side elevational view of an actuator of the bicycle drive train illustrated in FIG. 1.

As seen in FIG. 7, the actuator 80 is configured to move the second link 76 from the rest position P1 to each of the first operated position P2 and the second operated position P3. The actuator 80 includes a guide structure 84. The guide structure 84 includes a first guide 86 and a second guide 88. The first guide 86 is secured to the electric motor 82. The second guide 88 is rotatably coupled to the first guide 86. The electric motor 82 includes a rotational shaft 82A coupled to the second guide 88. The electric motor 82 is configured to rotate the second guide 88 relative to the first guide 86.

Figure 8:
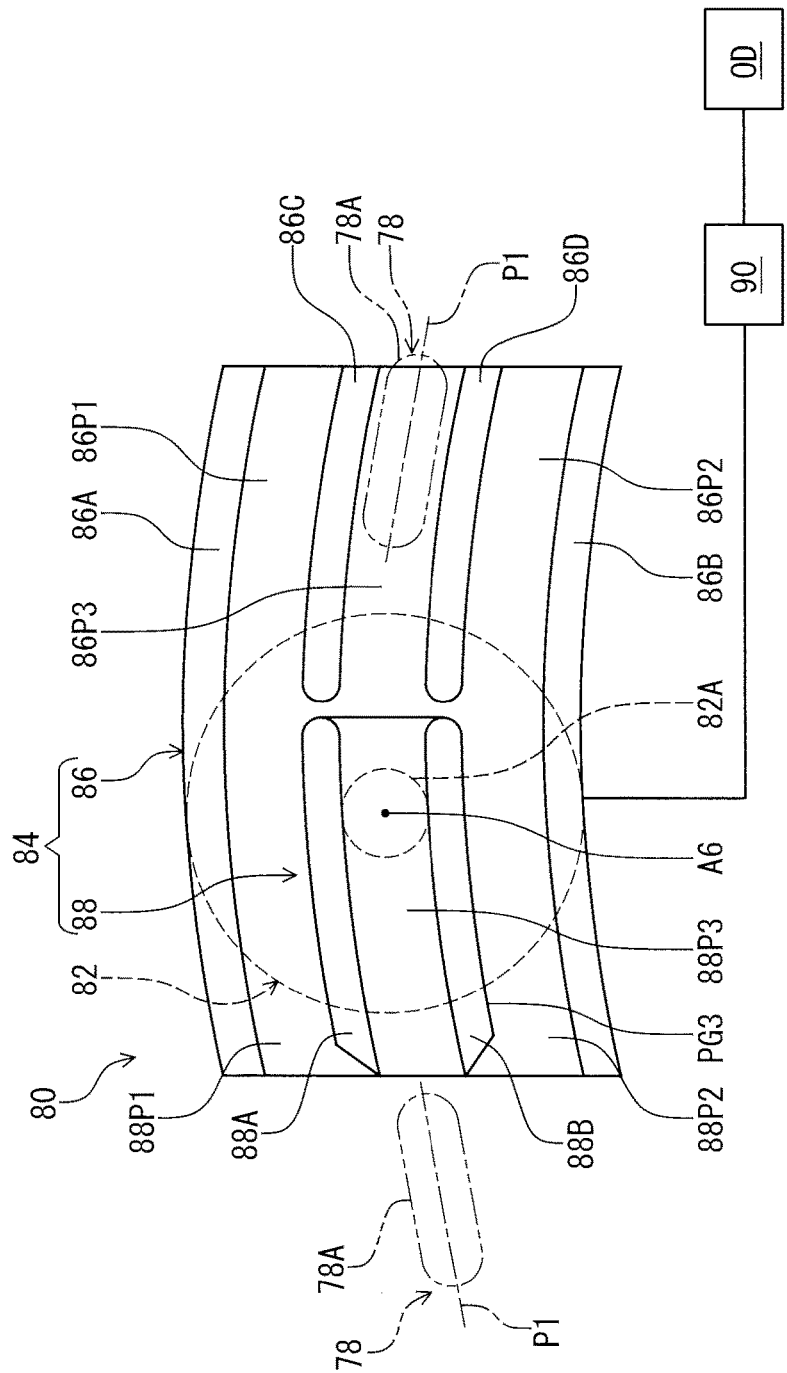
FIG. 8 is a schematic side elevational view of the actuator of the bicycle drive train illustrated in FIG. 1 (intermediate position).

As seen in FIG. 8, the first guide 86 includes a first outer guide wall 86A, a second outer guide wall 86B, a first inner guide wall 86C, and a second inner guide wall 86D. The first guide 86 includes a first guide path 86P1, a second guide path 86P2, and an intermediate guide path 86P3. The first guide path 86P1 is provided between the first outer guide wall 86A and the first inner guide wall 86C. The second guide path 86P2 is provided between the second outer guide wall 86B and the second inner guide wall 86D. The intermediate guide path 86P3 is provided between the first inner guide wall 86C and the second inner guide wall 86D.

Figure 9:
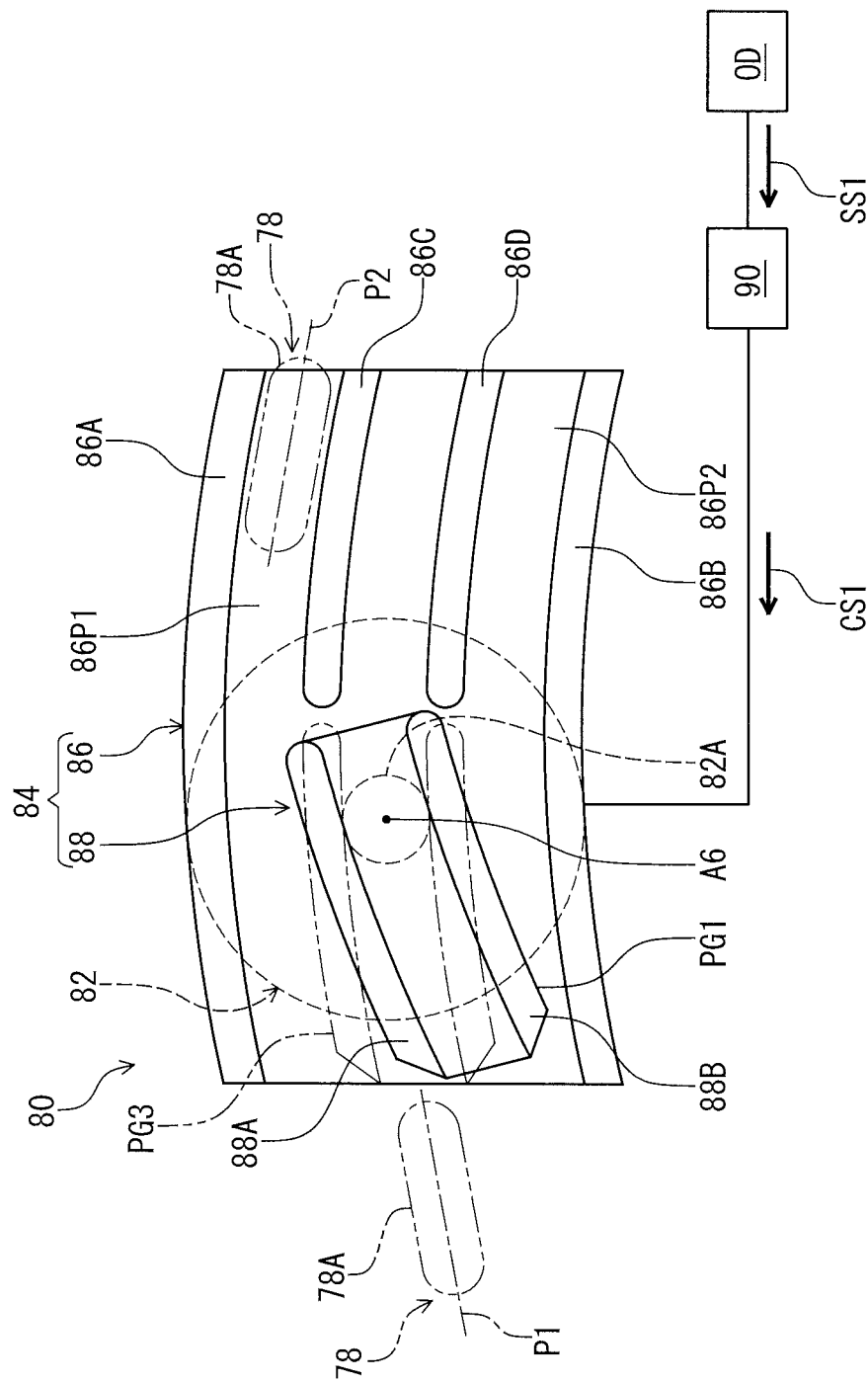
FIG. 9 is a schematic side elevational view of the actuator of the bicycle drive train illustrated in FIG. 1 (first guide position).
Figure 10:
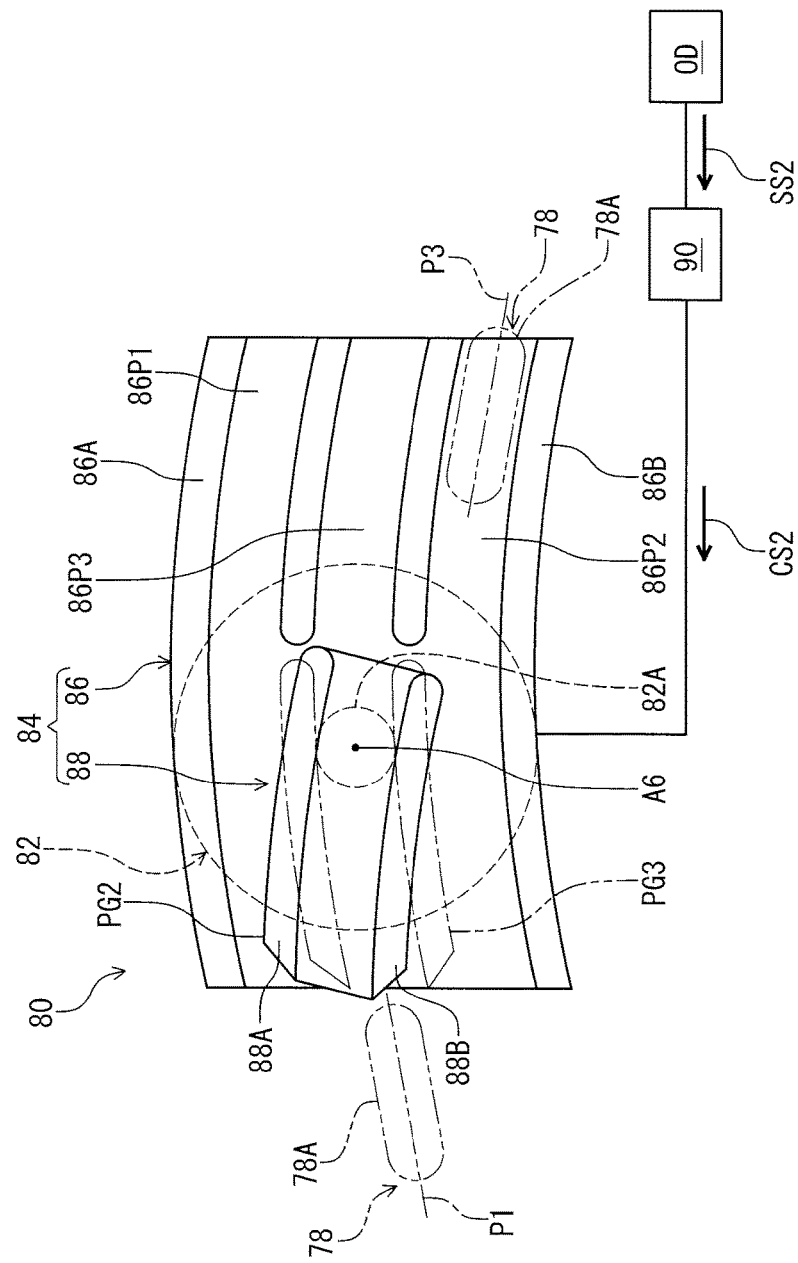
FIG. 10 is a schematic side elevational view of the actuator of the bicycle drive train illustrated in FIG. 1 (second guide position).

The second guide 88 includes a first guide wall 88A and a second guide wall 88B. The second guide 88 is pivotable relative to the first guide 86 about a guide pivot axis A6 between a first guide position PG1 (FIG. 9) and a second guide position PG2 (FIG. 10). The electric motor 82 is configured to pivot the second guide 88 from an intermediate guide position PG3 to each of the first guide position PG1 and the second guide position PG2.

A first additional guide path 88P1 is defined between the first outer guide wall 86A and the first guide wall 88A. A second additional guide path 88P2 is defined between the second outer guide wall 86B and the second guide wall 88B. The second guide 88 includes an additional intermediate guide path 88P3 provided between the first guide wall 88A and the second guide wall 88B. The first additional guide path 88P1 is connected to the first guide path 86P1. The second additional guide path 88P2 is connected to the second guide path 86P2. The additional intermediate guide path 88P3 is connected to the intermediate guide path 86P3.

As seen in FIG. 8, the end 78A of the second link 78 passes through the additional intermediate guide path 88P3 and the intermediate guide path 86P3 in an intermate guide state where the second guide 88 is in the intermediate guide position PG3. As seen in FIG. 9, the first guide wall 88A guides the end 76A of the second link 76 to the first additional guide path 88P1 and the first guide path 86P1 in a first guide state where the second guide 88 is in the first guide position PG1. As seen in FIG. 10, the second guide wall 88B guides the end 76A of the second link 76 to the second additional guide path 88P2 and the second guide path 86P2 in a second guide state where the second guide 88 is in the second guide position PG2.

As seen in FIG. 8, the second link 78 is in the rest position P1 while the end 78A of the second link 78 passes through the intermediate guide path 86P3. As seen in FIG. 9, the second link 78 is in the first operated position P2 while the end 78A of the second link 78 passes through the intermediate guide path 86P3. As seen in FIG. 10, the second link 78 is in the second operated position P3 while the end 78A of the second link 78 passes through the second guide path 86P2.

As seen in FIG. 4, the plurality of first axially displaceable teeth 44 is positioned in the first rest position P11 while the end 78A of the second link 78 passes through the intermediate guide path 86P3. As seen in FIG. 5, the plurality of first axially displaceable teeth 44 is positioned in the first displacement position P12 while the end 78A of the second link 78 passes through the first guide path 86P1. As seen in FIG. 6, the plurality of first axially displaceable teeth 44 is positioned in the first additional displacement position P13 while the end 78A of the second link 78 passes through the second guide path 86P2. The plurality of second axially displaceable teeth 54 and the plurality of third axially displaceable teeth 64 are operated in the same manner as the plurality of first axially displaceable teeth 44.

Figure 11:
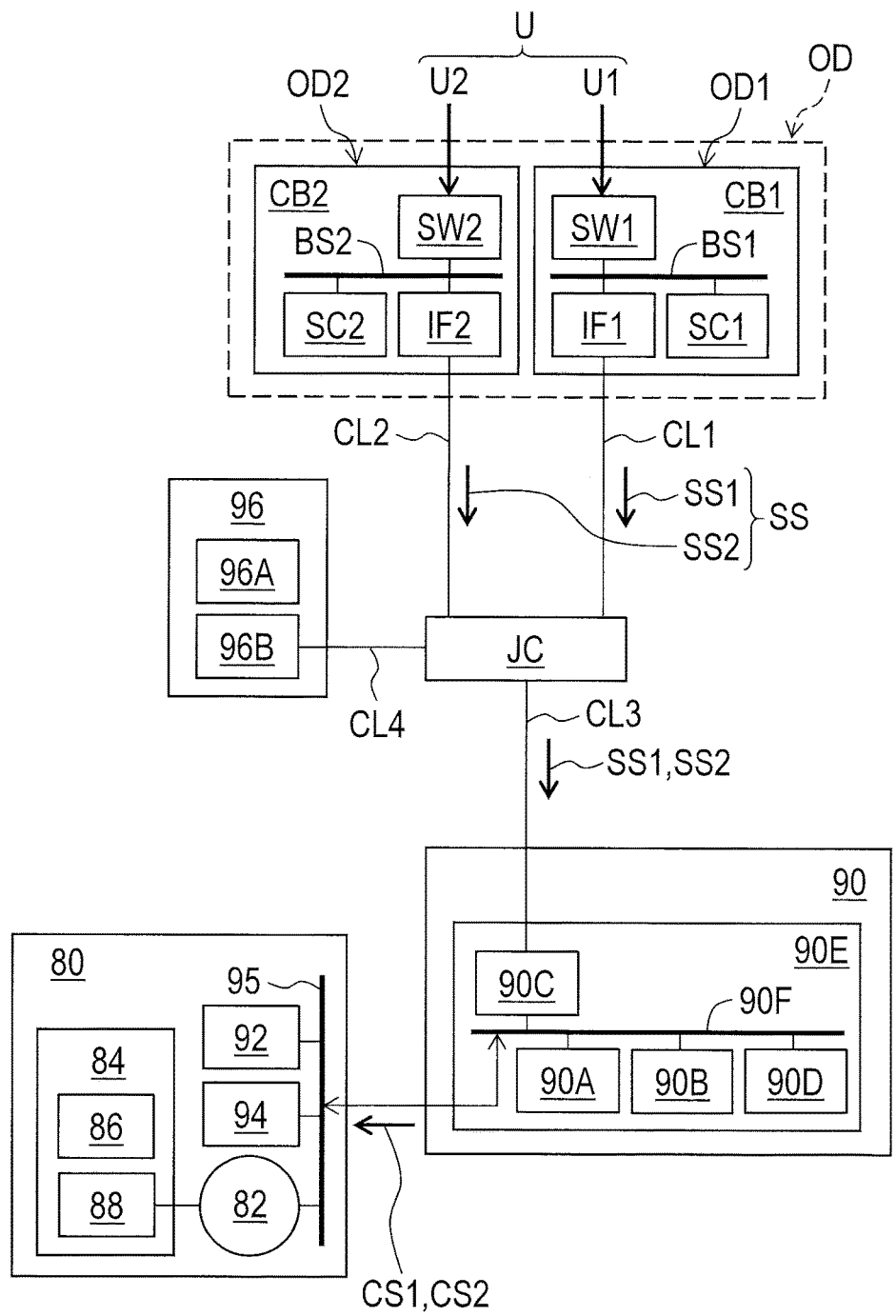
FIG. 11 is a schematic block diagram of the bicycle drive train illustrated in FIG.

As seen in FIG. 11, the bicycle drive train 10 includes a controller 90. The controller 90 is electrically connected to the actuator 80 to control the actuator 80 based on a shift signal SS transmitted from a bicycle operating device OD. The controller 90 is configured to control the actuator 80 to move the second guide 88 from the intermediate guide position PG3 to the first guide position PG1 in response to a first shift signal SS1 transmitted from the bicycle operating device OD. The controller 90 is configured to control the actuator 80 to move the second guide 88 from the intermediate guide position PG3 to the second guide position PG2 in response to a second shift signal SS2 transmitted from the bicycle operating device OD.

The bicycle operating device OD is configured to receive a user input U. The bicycle operating device OD includes a first operating device OD1 and a second operating device OD2. The user input includes a first user input U1 and a second user input U2. The first operating device OD1 is configured to receive the first user input U1. The second operating device OD2 is configured to receive the second user input U2. In this embodiment, the first user input U1 includes an upshift input, and the second user input U2 includes a downshift input.

For example, the first operating device OD1 and the second operating device OD2 are mounted to a handlebar (not shown). The first operating device OD1 is a right-hand control device. The second operating device OD2 is a left-hand control device. However, the bicycle operating device OD can include another operating device instead of or in addition to the first operating device OD1 and the second operating device OD2. One of the first operating device OD1 and the second operating device OD2 can be omitted from the bicycle operating device OD.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle drive train 10, should be interpreted relative to the bicycle equipped with the bicycle drive train 10 as used in an upright riding position on a horizontal surface.

As seen in FIG. 11, the first operating device OD1 includes a first electrical switch SW1, a first signal controller SC1, a first interface IF1, and a first circuit board CB1. The first electrical switch SW1, the first signal controller SC1, and the first interface IF1 are electrically mounted on the first circuit board CB1 and electrically connected to a first bus BS1. The first electrical switch SW1 is configured to receive the first user input U1 from the user. For example, the first electrical switch SW1 includes a push-button switch. The first signal controller SC1 is electrically connected to the first electrical switch SW1 to transmit the first shift signal SS1 in response to the first user input U1 received by the first electrical switch SW1. The first interface IF1 is electrically connected to the controller 90 using a power line communication (PLC). However, the first interface IF1 can include a wireless communicator wirelessly connected to the controller 90. Since the PLC technology has been known in the bicycle field, it will not be described in detail here for the sake of brevity.

As seen in FIG. 11, the second operating device OD2 includes a second electrical switch SW2, a second signal controller SC2, a second interface IF2, and a second circuit board CB2. The second electrical switch SW2, the second signal controller SC2, and the second interface IF2 are electrically mounted on the second circuit board CB2 and electrically connected to a second bus BS2. The second electrical switch SW2 is configured to receive the second user input U2 from the user. For example, the second electrical switch SW2 includes a push-button switch. The second signal controller SC2 is electrically connected to the second electrical switch SW2 to transmit the second shift signal SS2 in response to the second user input U2 received by the second electrical switch SW2. The second interface IF2 is electrically connected to the controller 90 using the PLC. However, the second interface IF2 can include a wireless communicator wirelessly connected to the controller 90. Since the PLC technology has been known in the bicycle field, it will not be described in detail here for the sake of brevity.

As seen in FIG. 5, the controller 90 is configured to control the actuator 80 to move the plurality of first axially displaceable teeth 44, the plurality of second axially displaceable teeth 54, and the third axially displaceable teeth 64 to the first displacement position P12, the second displacement position P22, and the third displacement position P32 in response to the first shift signal SS1. The controller 90 is configured to control the actuator 80 to move the plurality of first axially displaceable teeth 44, the plurality of second axially displaceable teeth 54, and the third axially displaceable teeth 64 to the first additional displacement position P13, the second additional displacement position P23, and the third additional displacement position P33 in response to the second shift signal SS2.

In this embodiment, as seen in FIG. 11, the controller 90 includes a processor 90A, a memory 90B, an interface 90C, and a signal generator 90D. The processor 90A, the memory 90B, the interface 90C, and the signal generator 90D are electrically mounted on a circuit board 90E and are electrically connected to a bus 90F.

The processor 90A includes a central processing unit (CPU) and a memory controller. The memory 90B is electrically connected to the processor 90A. The memory 90B includes a read only memory (ROM) and a random-access memory (RAM). The ROM includes a non-transitory computer-readable storage medium. The RAM includes a transitory computer-readable storage medium. The memory 90B includes storage areas each having an address in the ROM and the RAM. The processor 90A controls the memory 90B to store data in the storage areas of the memory 90B and reads data from the storage areas of the memory 90B. The memory 90B (e.g., the ROM) stores a program. The program is read into the processor 90A, and thereby functions of the controller 90 are performed.

The interface 90C is operatively connected to the bicycle operating device OD with a communication path to receive the shift signal SS from the bicycle operating device OD. In this embodiment, the interface 90C is electrically connected to the first interface IF1 and the second interface IF2 using the PLC. However, the interface 90C can include a wireless communicator wirelessly connected to at least one of the first interface IF1 and the second interface IF2.

The signal generator 90D is configured to generate a first control signal CS1 in response to the first shift signal SS1. The signal generator 90D is configured to generate a second control signal CS2 in response to the second shift signal SS2. The controller 90 is electrically connected to the actuator 80 to transmit the first and second control signals CS1 and CS2 to the actuator 80.

The actuator 80 includes a motor driver 92 and a position sensor 94. The electric motor 82, the motor driver 92, and the position sensor 94 are electrically connected to a bus 95. The motor driver 92 is configured to control the electric motor 82 based on the first control signal CS1 and the second control signal CS2 transmitted from the bicycle operating device OD. Examples of the electric motor 82 include a direct-current (DC) motor and a stepper motor. The position sensor 94 is configured to sense a current rotational position of the electric motor 82. Examples of the position sensor 94 include a potentiometer and a rotary encoder. The motor driver 92 is configured to control the electric motor 82 to rotate the rotational shaft 82A based on the current rotational position of the rotational shaft 82A of the electric motor 82.

As seen in FIGS. 9 and 11, the motor driver 92 is configured to control the electric motor 82 to move the second guide 88 to the first guide position PG1 (FIG. 9) and to keep the second guide 88 in the first guide position PG1 (FIG. 9) for a preset time in response to the first control signal CS1. The motor driver 92 is configured to control the electric motor 82 to return the second guide 88 from the first guide position PG1 (FIG. 9) to the intermediate guide position PG3 (FIG. 9) after the preset time is elapsed. Thus, as seen in FIG. 5, the first axially displaceable teeth 44, the second axially displaceable teeth 54, and the third axially displaceable teeth 64 are moved from the first rest position P11, the second rest position P21, and the third rest position P31 to the first displacement position P12, the second displacement position P22, and the third displacement position P32 during the preset time in response to the first shift signal SS1.

As seen in FIGS. 10 and 11, the motor driver 92 is configured to control the electric motor 82 to move the second guide 88 to the second guide position PG2 (FIG. 10) and to keep the second guide 88 in the second guide position PG2 (FIG. 10) for the preset time in response to the second control signal CS2. The motor driver 92 is configured to control the electric motor 82 to return the second guide 88 from the second guide position PG2 (FIG. 10) to the intermediate guide position PG3 (FIG. 10) after the preset time is elapsed. Thus, as seen in FIG. 6, the first axially displaceable teeth 44, the second axially displaceable teeth 54, and the third axially displaceable teeth 64 are moved from the first rest position P11, the second rest position P21, and the third rest position P31 to the first additional displacement position P13, the second additional displacement position P23, and the third additional displacement position P33 during the preset time in response to the second shift signal SS2.

As seen in FIG. 11, the bicycle drive train 10 comprises a power supply 96 configured to supply electricity to the actuator 80. The power supply 96 is electrically connected to the controller 90 and the actuator 80 to supply electricity to the controller 90 and the actuator 80. The power supply 96 includes a battery 96A and a battery holder 96B. Examples of the battery 96A include a primary battery such as a lithium manganese dioxide battery, and a secondary battery such as a lithium-ion secondary battery. The battery 96A is electrically mounted on the battery holder 96B. The battery holder 96B is electrically connected to the controller 90.

The PLC technology is used for communicating between electrical components. Power line communication (PLC) carries data on a conductor that is also used simultaneously for electric power transmission or electric power distribution to the electric component. In the illustrated embodiment, the electric power is supplied from the battery device B to the bicycle operating device OD (OD1, OD2), the actuator 80, and controller 90 with an electrical communication line CL. Furthermore, the controller 90 receives the shift signal SS (SS1, SS2) from the bicycle operating device OD (OD1, OD2) and transmits the first and second control signals CS1 and CS2 to the actuator 80 via the electrical communication line CL using the PLC. The electrical communication line CL includes a junction JC and cables CL1, CL2, CL3, and CL4. The first operating device OD1 (the first interface IF1) is electrically connected to the junction JC with the cable CL1. The second operating device OD2 (the second interface IF2) is electrically connected to the junction JC with the cable CL2. The interface 90C is electrically connected to the junction JC with the cable CL3. The power supply 96 (the battery holder 96B) is electrically connected to the junction JC with the cable CL4.

Figure 12:
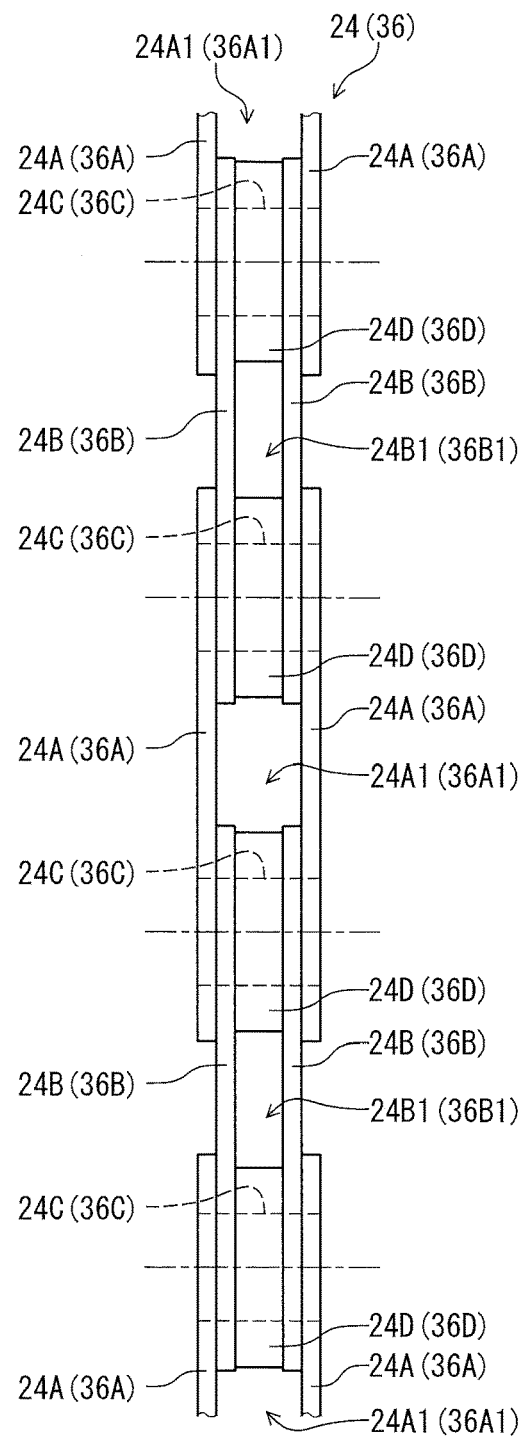
FIG. 12 is a plane view of a first chain or a second chain of the bicycle drive train illustrated in FIG. 1.

As seen in FIG. 12, the first chain 24 includes opposed pairs of first outer link plates 24A and opposed pairs of first inner link plates 24B. The opposed pair of first outer link plates 24A define a first outer link space 24A1. The opposed pair of first inner link plates 24B define a first inner link space 24B1. An axial width of the first outer link space 24A1 is larger than an axial width of the first inner link space 24B1. The first chain 24 includes a plurality of first pins 24C pivotally coupling the opposed pair of first outer link plates 24A and the opposed pair of first inner link plates 24B. The first chain 24 includes a plurality of first rollers 24D. The first roller 24D is rotatably mounted on the first pin 24C.

As seen in FIG. 12, the second chain 36 has substantially the same structure as that of the first chain 24. However, the second chain 36 can have a structure different from that of the first chain 24. The second chain 36 includes opposed pairs of second outer link plates 36A and opposed pairs of second inner link plates 36B. The opposed pair of second outer link plates 36A define a second outer link space 36A1. The opposed pair of second inner link plates 36B define a second inner link space 36B1. An axial width of the second outer link space 36A1 is larger than an axial width of the second inner link space 36B1. The second chain 36 includes a plurality of second pins 36C pivotally coupling the opposed pair of second outer link plates 36A and the opposed pair of second inner link plates 36B. The second chain 36 includes a plurality of second rollers 36D. The second roller 36D is rotatably mounted on the second pin 36C.

As seen in FIG. 3, the at least one first sprocket tooth 42 includes at least one first wide tooth 42A and at least one first narrow tooth 42B. In this embodiment, the plurality of first sprocket teeth 42 includes a plurality of first wide teeth 42A and a plurality of first narrow teeth 42B. However, a total number of the first wide teeth 42A is not limited to this embodiment. A total number of the first narrow teeth 42B is not limited to this embodiment. The first wide teeth 42A and the first narrow teeth 42B are alternately arranged in the circumferential direction D3.

The at least one first axially displaceable tooth 44 includes at least one first additional wide tooth 44A and at least one first additional narrow tooth 44B. In this embodiment, the plurality of first axially displaceable teeth 44 includes a plurality of first additional wide teeth 44A and a plurality of first additional narrow teeth 44B. However, a total number of the first additional wide teeth 44A is not limited to this embodiment. A total number of the first additional narrow teeth 44B is not limited to this embodiment. The first additional wide teeth 44A and the first additional narrow teeth 44B are alternately arranged in the circumferential direction D3.

Figure 13:
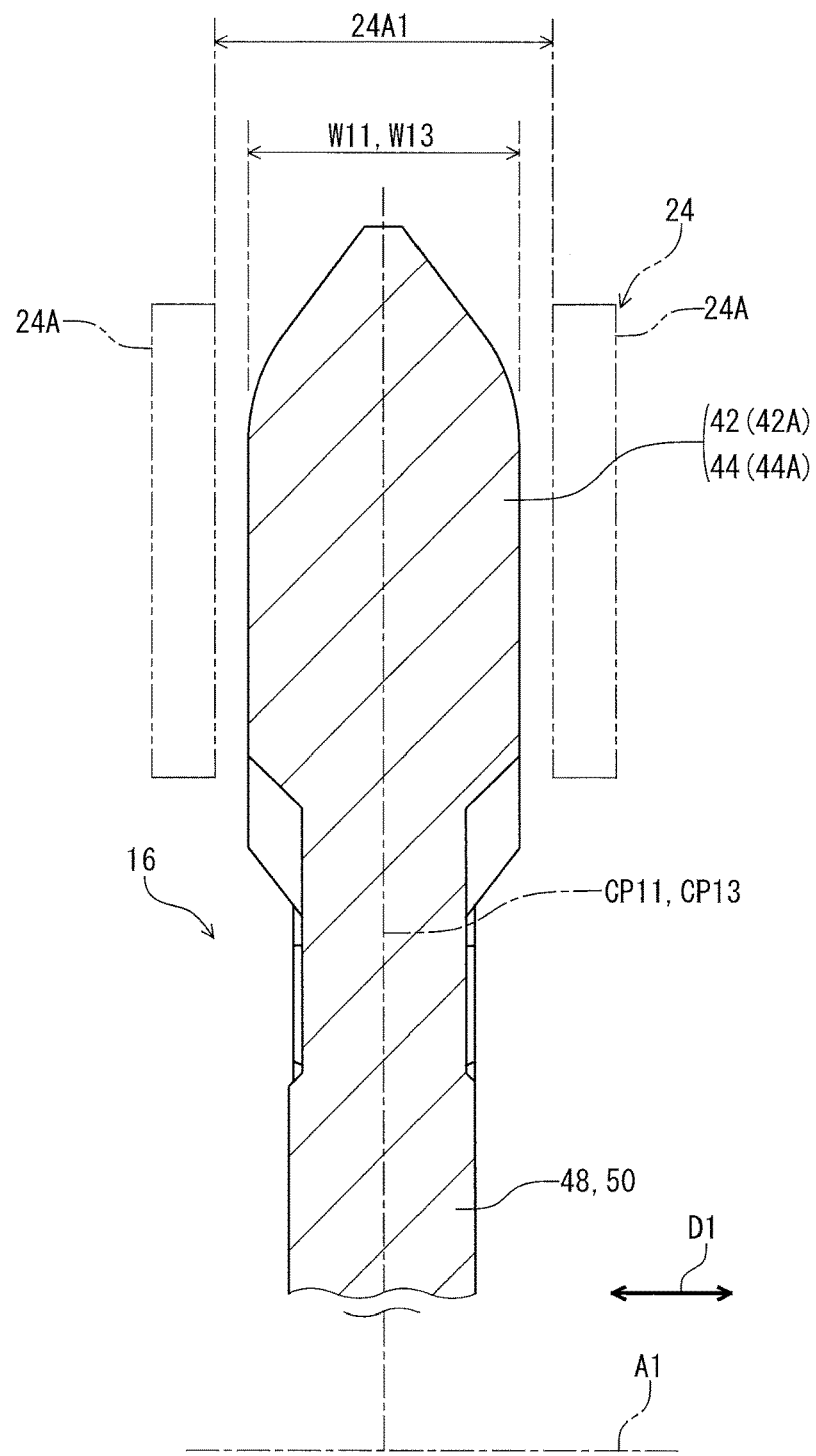
FIG. 13 is a cross-sectional view of a first sprocket of the sprocket assembly illustrated in FIG. 3.

As seen in FIG. 13, the at least one first wide tooth 42A has a first maximum width W11 defined in the axial direction D1. The first wide tooth 42A is engageable in the first outer link space 24A1 of the first chain 24. The first maximum width W11 is smaller than the axial length of the first outer link space 24A1. The first wide tooth 42A has a first center plane CP11 defined to bisect the first maximum width W11.

Figure 14:
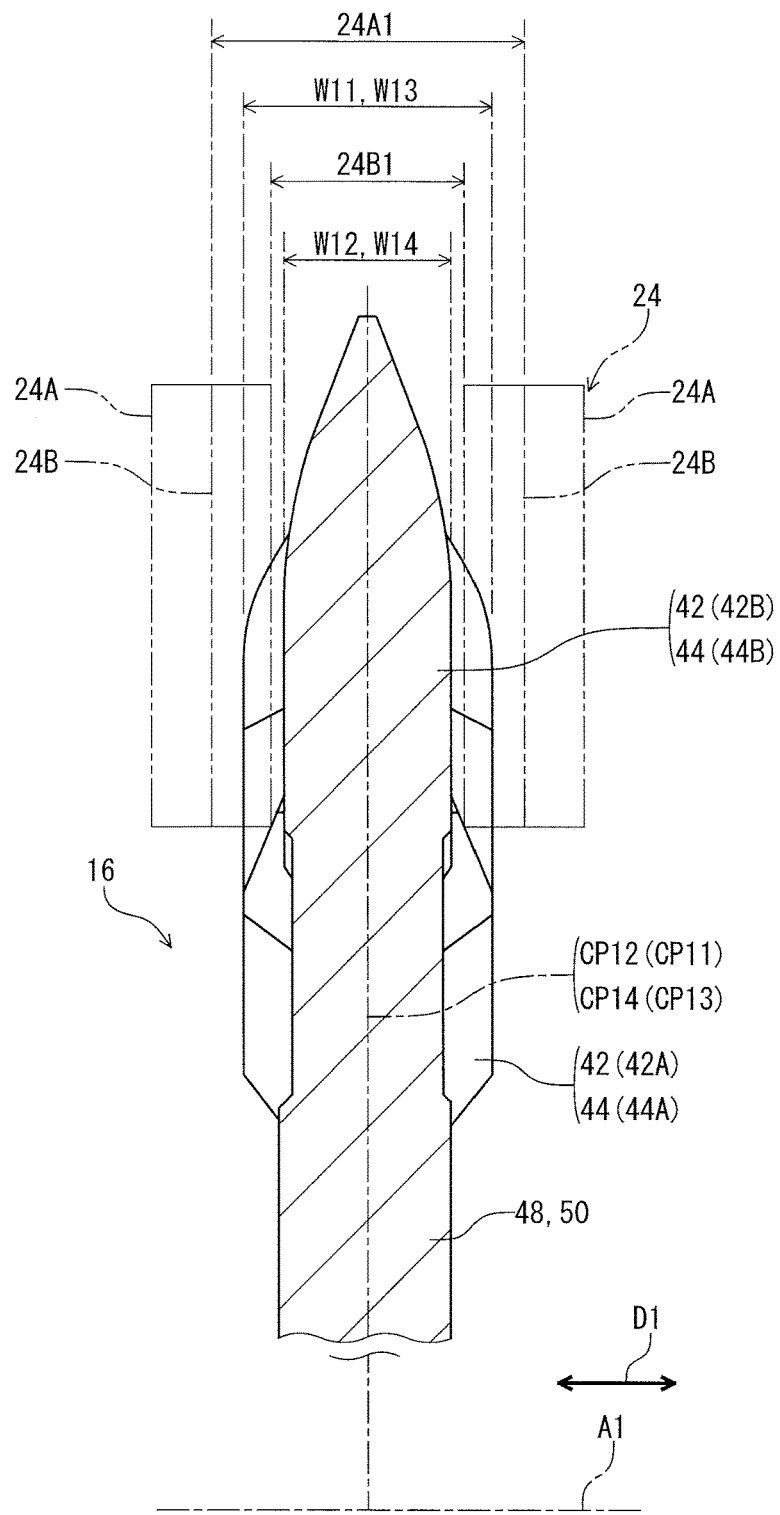
FIG. 14 is another cross-sectional view of the first sprocket of the sprocket assembly illustrated in FIG. 3.

As seen in FIG. 14, the at least one first narrow tooth 42B has a first additional maximum width W12 defined in the axial direction D1. The first narrow tooth 42B is engageable in the first inner link space 24B1 of the first chain 24. The first additional maximum width W12 is smaller than the axial length of the first inner link space 24B1. The first maximum width W11 is larger than the first additional maximum width W12. The first maximum width W11 is larger than the axial length of the first inner link space 24B1. The first additional maximum width W12 is smaller than the axial length of the first outer link space 24A1.

The first narrow tooth 42B has a first additional center plane CP12 defined to bisect the first additional maximum width W12. In this embodiment, the first additional center plane CP12 coincides with the first center plane CP11. However, the first additional center plane CP12 can be offset from the first center plane CP11.

As seen in FIG. 13, the first additional wide tooth 44A has substantially the same structure as that of the first wide tooth 42A. The first additional narrow tooth 44B has substantially the same structure as that of the first narrow tooth 42B. However, the first additional wide tooth 44A can have a structure different from that of the first wide tooth 42A. The first additional narrow tooth 44B can have a structure different from that of the first narrow tooth 42B.

The at least one first additional wide tooth 44A has a first maximum tooth-width W13 defined in the axial direction D1. The first additional wide tooth 44A is engageable in the first outer link space 24A1 of the first chain 24. The first maximum tooth-width W13 is smaller than the axial length of the first outer link space 24A1. The first additional wide tooth 44A has a first center plane CP13 defined to bisect the first maximum tooth-width W13.

As seen in FIG. 14, the at least one first additional narrow tooth 44B has a first additional maximum tooth-width W14 defined in the axial direction D1. The first additional narrow tooth 44B is engageable in the first inner link space 24B1 of the first chain 24. The first additional maximum tooth-width W14 is smaller than the axial length of the first inner link space 24B1. The first maximum tooth-width W13 is larger than the first additional maximum tooth-width W14. The first maximum tooth-width W13 is larger than the axial length of the first inner link space 24B1. The first additional maximum tooth-width W14 is smaller than the axial length of the first outer link space 24A1.

The first additional narrow tooth 44B has a first additional center plane CP14 defined to bisect the first additional maximum tooth-width W14. In this embodiment, the first additional center plane CP14 coincides with the first center plane CP13. However, the first additional center plane CP14 can be offset from the first center plane CP13.

As seen in FIG. 3, the at least one second sprocket tooth 46 includes at least one second wide tooth 46A and at least one second narrow tooth 46B. In this embodiment, the plurality of second sprocket teeth 46 includes a plurality of second wide teeth 46A and a plurality of second narrow teeth 46B. However, a total number of the second wide teeth 46A is not limited to this embodiment. A total number of the second narrow teeth 46B is not limited to this embodiment. The second wide teeth 46A and the second narrow teeth 46B are alternately arranged in the circumferential direction D3.

The at least one second axially displaceable tooth 54 includes at least one second additional wide tooth 54A and at least one second additional narrow tooth 54B. In this embodiment, the plurality of second axially displaceable teeth 54 includes a plurality of second additional wide teeth 54A and a plurality of second additional narrow teeth 54B. However, a total number of the second additional wide teeth 54A is not limited to this embodiment. A total number of the second additional narrow teeth 54B is not limited to this embodiment. The second additional wide teeth 54A and the second additional narrow teeth 54B are alternately arranged in the circumferential direction D3.

Figure 15:
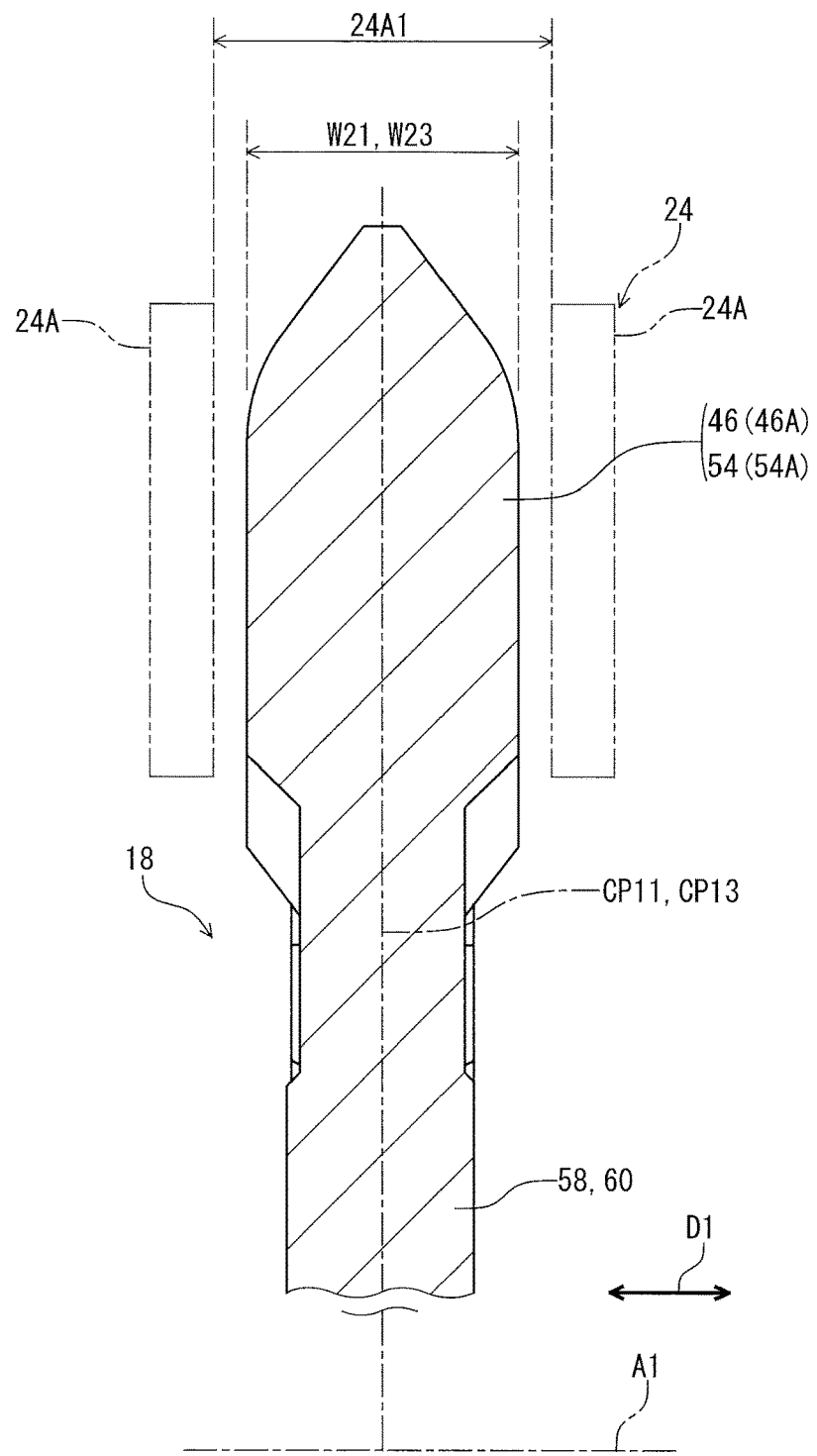
FIG. 15 is a cross-sectional view of a second sprocket of the sprocket assembly illustrated in FIG. 3.

As seen in FIG. 15, the at least one second wide tooth 46A has a second maximum width W21 defined in the axial direction D1. The second wide tooth 46A is engageable in the first outer link space 24A1 of the first chain 24. The second maximum width W21 is smaller than the axial length of the first outer link space 24A1. The second wide tooth 46A has a second center plane CP21 defined to bisect the second maximum width W21.

Figure 16:
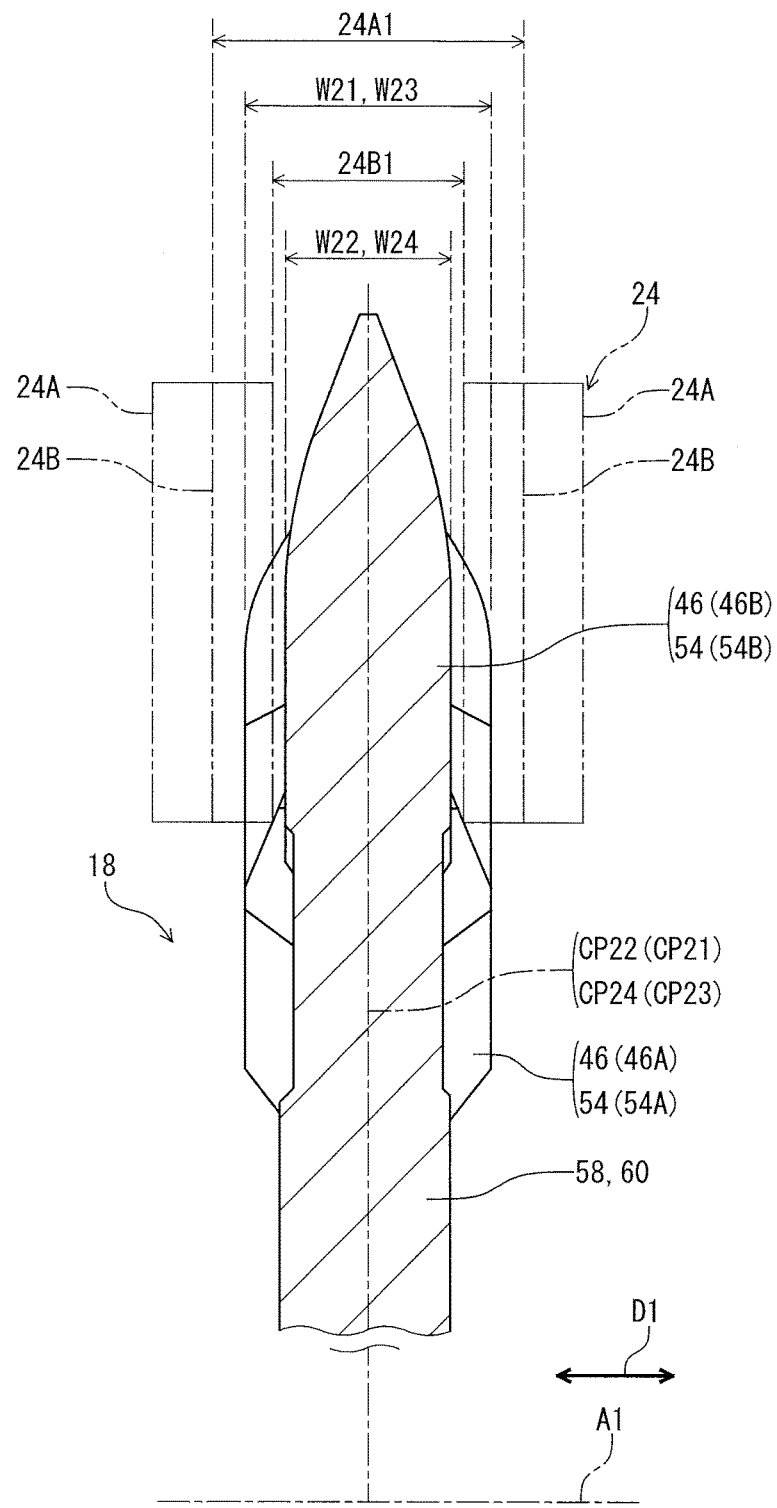
FIG. 16 is another cross-sectional view of the second sprocket of the sprocket assembly illustrated in FIG. 3.

As seen in FIG. 16, the at least one second narrow tooth 46B has a second additional maximum width W22 defined in the axial direction D1. The second narrow tooth 46B is engageable in the first inner link space 24B1 of the first chain 24. The second additional maximum width W22 is smaller than the axial length of the first inner link space 24B1. The second maximum width W21 is larger than the second additional maximum width W22. The second maximum width W21 is larger than the axial length of the first inner link space 24B1. The second additional maximum width W22 is smaller than the axial length of the first outer link space 24A1.

The second narrow tooth 46B has a second additional center plane CP22 defined to bisect the second additional maximum width W22. In this embodiment, the second additional center plane CP22 coincides with the second center plane CP21. However, the second additional center plane CP22 can be offset from the second center plane CP21.

As seen in FIG. 15, the second additional wide tooth 54A has substantially the same structure as that of the second wide tooth 46A. The second additional narrow tooth 54B has substantially the same structure as that of the second narrow tooth 46B. However, the second additional wide tooth 54A can have a structure different from that of the second wide tooth 46A. The second additional narrow tooth 54B can have a structure different from that of the second narrow tooth 46B.

The at least one second additional wide tooth 54A has a second maximum tooth-width W23 defined in the axial direction D1. The second additional wide tooth 54A is engageable in the first outer link space 24A1 of the first chain 24. The second maximum tooth-width W23 is smaller than the axial length of the first outer link space 24A1. The second additional wide tooth 54A has a second center plane CP23 defined to bisect the second maximum tooth-width W23.

As seen in FIG. 16, the at least one second additional narrow tooth 54B has a second additional maximum tooth-width W24 defined in the axial direction D1. The second additional narrow tooth 54B is engageable in the first inner link space 24B1 of the first chain 24. The second additional maximum tooth-width W24 is smaller than the axial length of the first inner link space 24B1. The second maximum tooth-width W23 is larger than the second additional maximum tooth-width W24. The second maximum tooth-width W23 is larger than the axial length of the first inner link space 24B1. The second additional maximum tooth-width W24 is smaller than the axial length of the first outer link space 24A1.

The second additional narrow tooth 54B has a second additional center plane CP24 defined to bisect the second additional maximum tooth-width W24. In this embodiment, the second additional center plane CP24 coincides with the second center plane CP23. However, the second additional center plane CP24 can be offset from the second center plane CP23.

As seen in FIG. 3, the at least one third sprocket tooth 56 includes at least one third wide tooth 56A and at least one third narrow tooth 56B. In this embodiment, the plurality of third sprocket teeth 56 includes a plurality of third wide teeth 56A and a plurality of third narrow teeth 56B. However, a total number of the third wide teeth 56A is not limited to this embodiment. A total number of the third narrow teeth 56B is not limited to this embodiment. The third wide teeth 56A and the third narrow teeth 56B are alternately arranged in the circumferential direction D3.

The at least one third axially displaceable tooth 64 includes at least one third additional wide tooth 64A and at least one third additional narrow tooth 64B. In this embodiment, the plurality of third axially displaceable teeth 64 includes a plurality of third additional wide teeth 64A and a plurality of third additional narrow teeth 64B. However, a total number of the third additional wide teeth 64A is not limited to this embodiment. A total number of the third additional narrow teeth 64B is not limited to this embodiment. The third additional wide teeth 64A and the third additional narrow teeth 64B are alternately arranged in the circumferential direction D3.

The third wide tooth 56A has substantially the same structure as that of the first wide tooth 42A. The third narrow tooth 56B has substantially the same structure as that of the first narrow tooth 42B. The third additional wide tooth 64A has substantially the same structure as that of the first additional wide tooth 44A. The third additional narrow tooth 64B has substantially the same structure as that of the first additional narrow tooth 44B. Thus, they will not be described in detail here for the sake of brevity.

As seen in FIG. 3, the at least one fourth sprocket tooth 66 includes at least one fourth wide tooth 66A and at least one fourth narrow tooth 66B. In this embodiment, the plurality of fourth sprocket teeth 66 includes a plurality of fourth wide teeth 66A and a plurality of fourth narrow teeth 66B. However, a total number of the fourth wide teeth 66A is not limited to this embodiment. A total number of the fourth narrow teeth 66B is not limited to this embodiment. The fourth wide teeth 66A and the fourth narrow teeth 66B are alternately arranged in the circumferential direction D3.

The fourth wide tooth 66A has substantially the same structure as that of the first wide tooth 42A. The fourth narrow tooth 66B has substantially the same structure as that of the first narrow tooth 42B. Thus, they will not be described in detail here for the sake of brevity.

As seen in FIG. 1, the floating sprocket 14 includes a floating sprocket body 97 and at least one floating sprocket tooth 98 extending radially outwardly from the floating sprocket body 97. The at least one floating sprocket tooth 98 includes a plurality of floating sprocket teeth 98 extending radially outwardly from the floating sprocket body 97. The plurality of floating sprocket teeth 98 includes a plurality of floating wide teeth 98A and a plurality of floating narrow teeth 98B.

The floating wide tooth 98A has substantially the same structure as that of the first wide tooth 42A. The floating narrow tooth 98B has substantially the same structure as that of the first narrow tooth 42B. Thus, they will not be described in detail here for the sake of brevity.

As seen in FIG. 1, the front sprocket 32 includes a front sprocket body 100, at least one first front sprocket tooth 102, and at least one second front sprocket teeth 103. In this embodiment, the front sprocket 32 includes a plurality of first front sprocket teeth 102 and a plurality of second front sprocket teeth 103. The first front sprocket teeth 102 extend radially outwardly from the front sprocket body 100. The second front sprocket teeth 103 extend radially outwardly from the front sprocket body 100. The first front sprocket teeth 102 and the second front sprocket teeth 103 are alternately arranged in a circumferential direction of the front sprocket 32.

Figure 17:
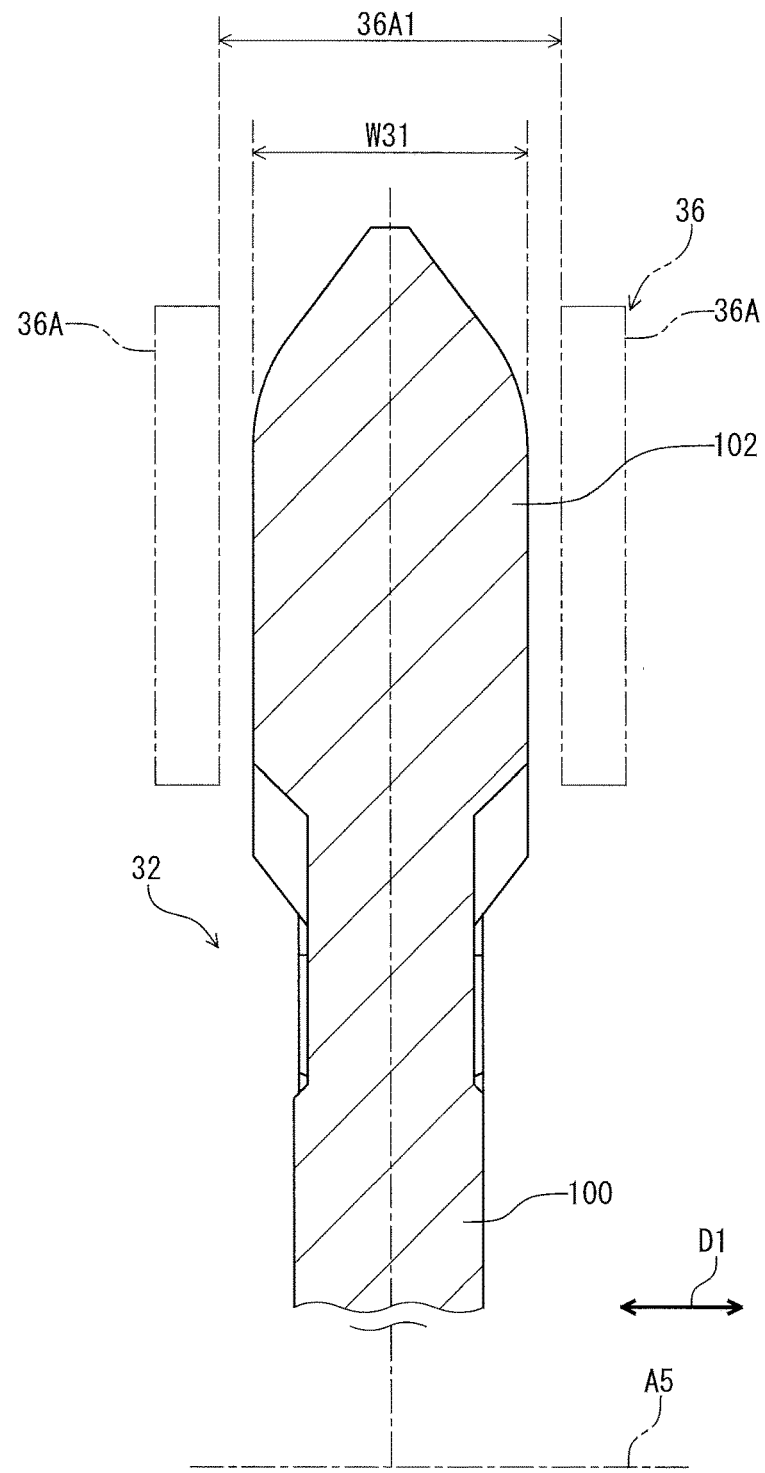
FIG. 17 is a cross-sectional view of a front sprocket of the bicycle drive train illustrated in FIG. 1.
Figure 18:
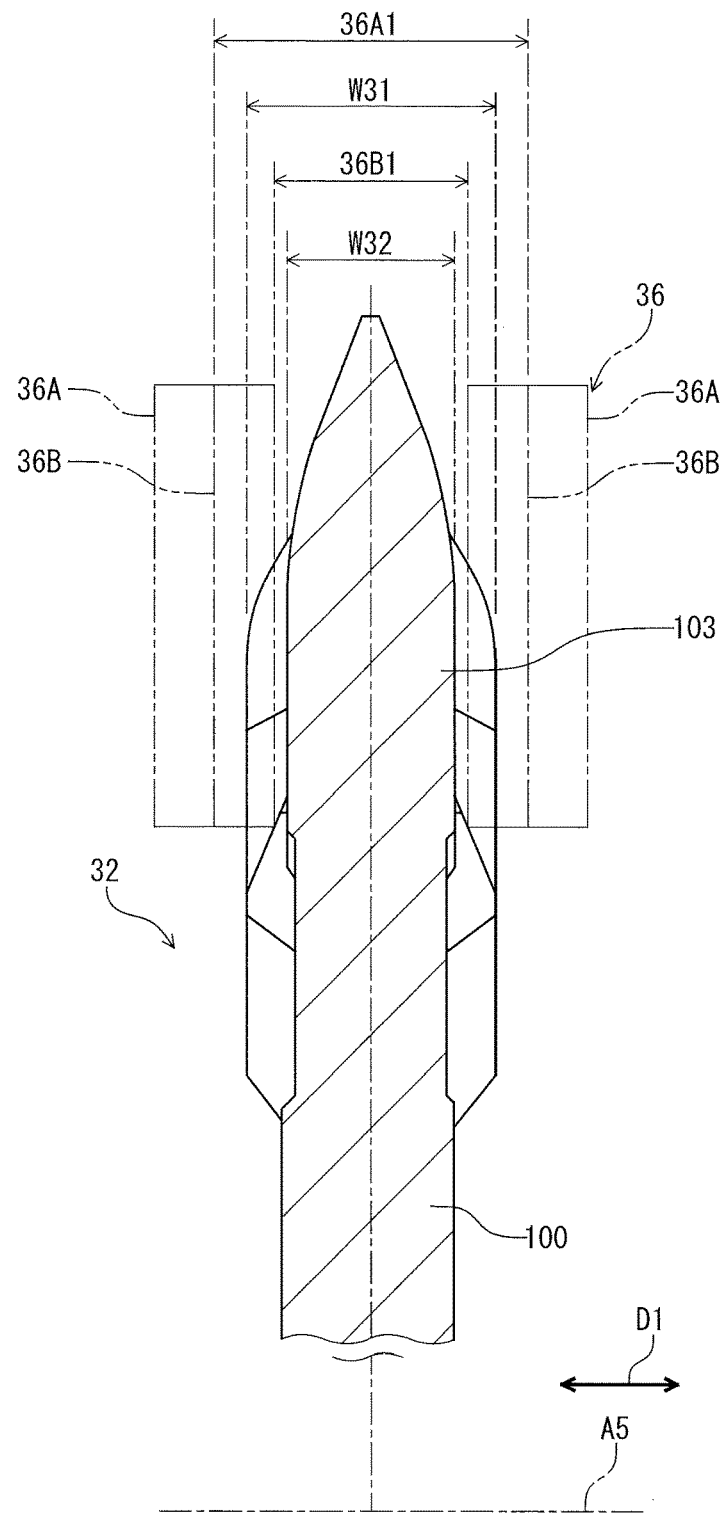
FIG. 18 is another cross-sectional view of the front sprocket of the bicycle drive train illustrated in FIG. 1.

As seen in FIG. 17, the at least one first front sprocket tooth 102 has a first maximum axial width W31 defined in the axial direction D1. As seen in FIG. 18, the at least one second front sprocket tooth 103 has a second maximum axial width W32 defined in the axial direction D1. The first maximum axial width W31 is larger than the second maximum axial width W32. The first front sprocket tooth 102 has substantially the same structure as that of the first wide tooth 42A. The second front sprocket tooth 103 has substantially the same structure as that of the first narrow tooth 42B. Thus, they will not be described in detail here for the sake of brevity.

As seen in FIG. 3, the intermediate sprocket 34 includes an intermediate sprocket body 104 and at least one intermediate sprocket tooth 106 extending radially outwardly from the intermediate sprocket body 104. The at least one intermediate sprocket tooth 106 includes a plurality of intermediate sprocket teeth 106 extending radially outwardly from the intermediate sprocket body 104. The plurality of intermediate sprocket teeth 106 includes a plurality of intermediate wide teeth 106A and a plurality of intermediate narrow teeth 106B.

The intermediate wide tooth 106A has substantially the same structure as that of the first wide tooth 42A. The intermediate narrow tooth 106B has substantially the same structure as that of the first narrow tooth 42B. Thus, they will not be described in detail here for the sake of brevity.

Upshifting and downshifting in the bicycle drive train 10 will be described in detail below referring to FIGS. 5 and 6.

As seen in FIG. 5, the first axially displaceable teeth 44 are moved toward the second sprocket teeth 46 by the actuator 80 when the controller 90 receives the first shift signal SS1 from the bicycle operating device OD. At least one of the first axially displaceable teeth 44 catch the first chain 24 when the first axially displaceable teeth 44 are moved toward the second sprocket teeth 46 in a state where the first chain 24 is engaged with the second sprocket 18. Thus, the first chain 24 is shifted from the second sprocket 18 to the first sprocket 16. At this time, the floating sprocket 14 and the chain tensioner 26 are moved in the axial direction D1 in response to an axial movement of the first chain 24.

As seen in FIG. 6, the second axially displaceable teeth 54 are moved toward the first sprocket teeth 42 by the actuator 80 when the controller 90 receives the second shift signal SS2 from the bicycle operating device OD. At least one of the second axially displaceable teeth 54 catch the first chain 24 when the second axially displaceable teeth 54 are moved toward the first sprocket teeth 42 in a state where the first chain 24 is engaged with the first sprocket 16. Thus, the first chain 24 is shifted from the first sprocket 16 to the second sprocket 18. At this time, the floating sprocket 14 and the chain tensioner 26 are moved in the axial direction D1 in response to an axial movement of the first chain 24.

Second Embodiment

A bicycle drive train 210 in accordance with a second embodiment will be described below referring to FIGS. 19 and 20. The bicycle drive train 210 has the same structure and/or configuration as those of the bicycle drive train 10 except for the arrangement of the sprocket assembly 12 and the floating sprocket 14. Thus, elements having substantially the same function as those in the first embodiment will be numbered the same here, and will not be described and/or illustrated again in detail here for the sake of brevity.

Figure 19:
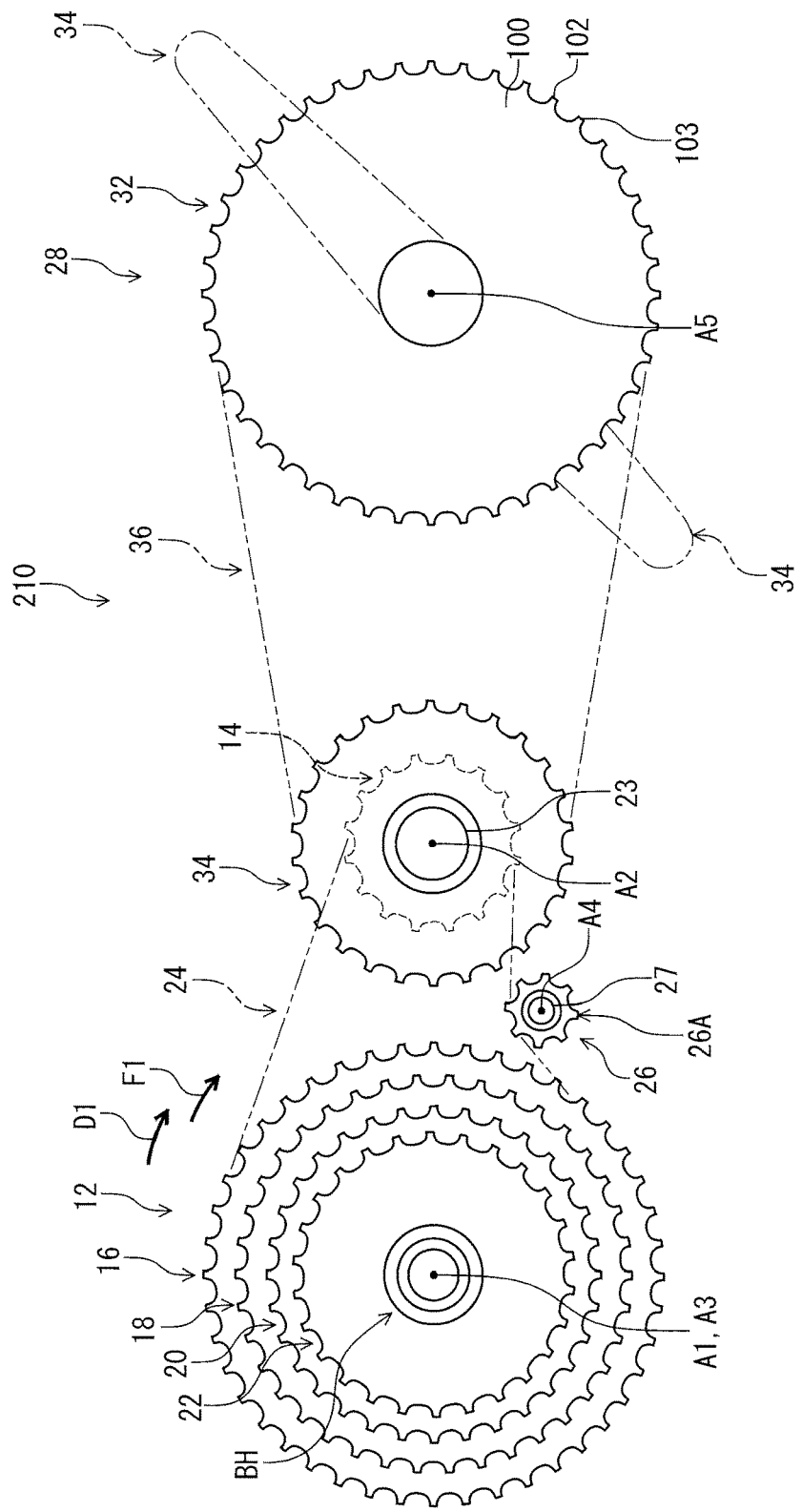
FIG. 19 is a schematic side elevational view of a bicycle drive train in accordance with a second embodiment.
Figure 20:
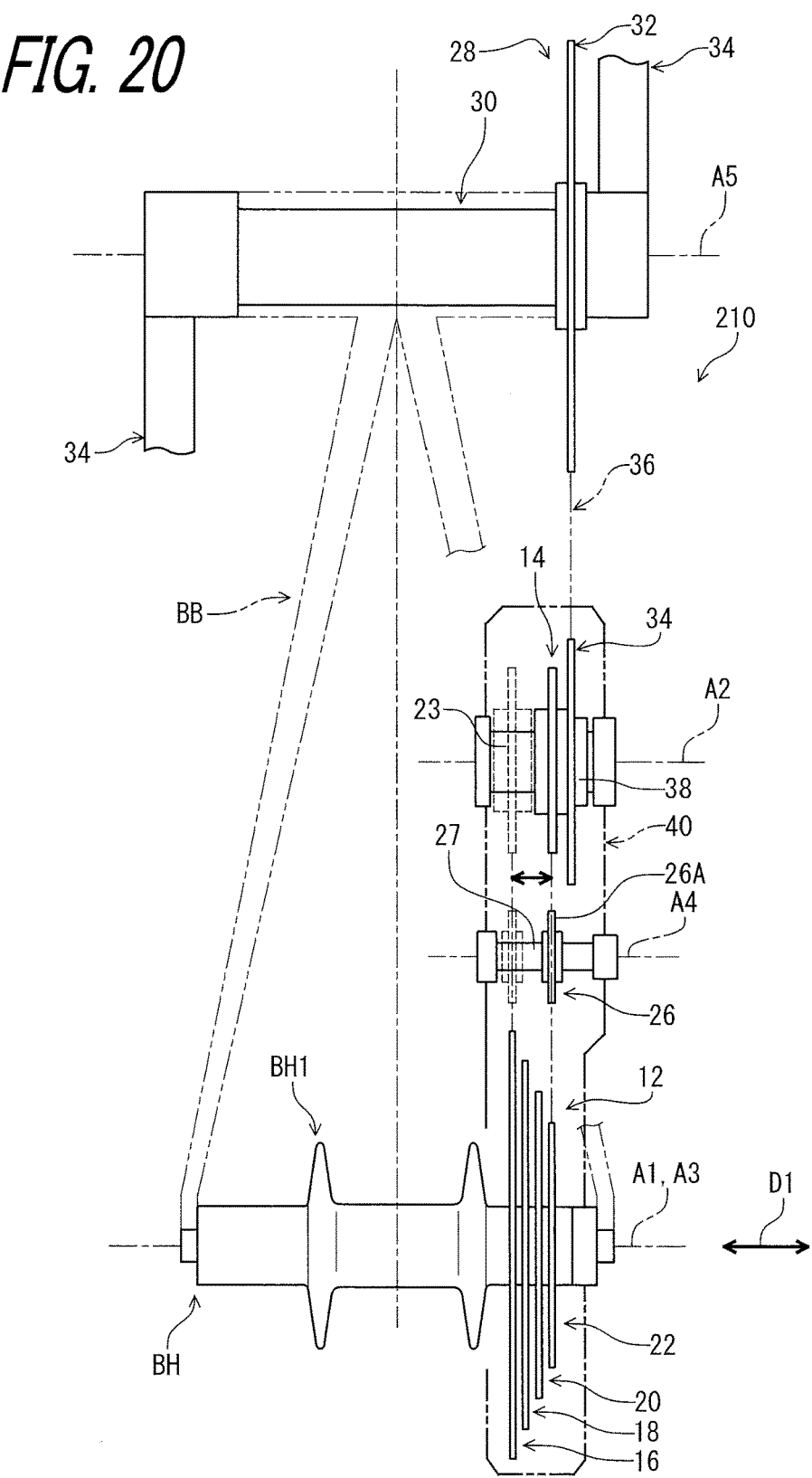
FIG. 20 is a schematic plan view of the bicycle drive train illustrated in FIG. 19.

As seen in FIGS. 19 and 20, in the bicycle drive train 210, the sprocket assembly 12 is a rear sprocket assembly. The first rotational center axis A1 is coincident with the rotational center axis A3 of the bicycle rear hub assembly BH in a state where the bicycle drive train 210 is mounted to the bicycle body BB. The sprocket assembly 12 is mounted on the bicycle rear hub assembly BH. The floating sprocket 14 is movably mounted on the sprocket support shaft 23. The intermediate sprocket 34 is coupled to the floating sprocket 14 rotatable about the second rotational center axis A2. The floating sprocket 14 is movable relative to the sprocket assembly 12 and the intermediate sprocket 34 in the axial direction D1.

Third Embodiment

A bicycle drive train 310 in accordance with a third embodiment will be described below referring to FIGS. 21 and 22. The bicycle drive train 310 has the same structure and/or configuration as those of the bicycle drive train 210 except for the arrangement of the floating sprocket 14. Thus, elements having substantially the same function as those in the above embodiments will be numbered the same here, and will not be described and/or illustrated again in detail here for the sake of brevity.

Figure 21:
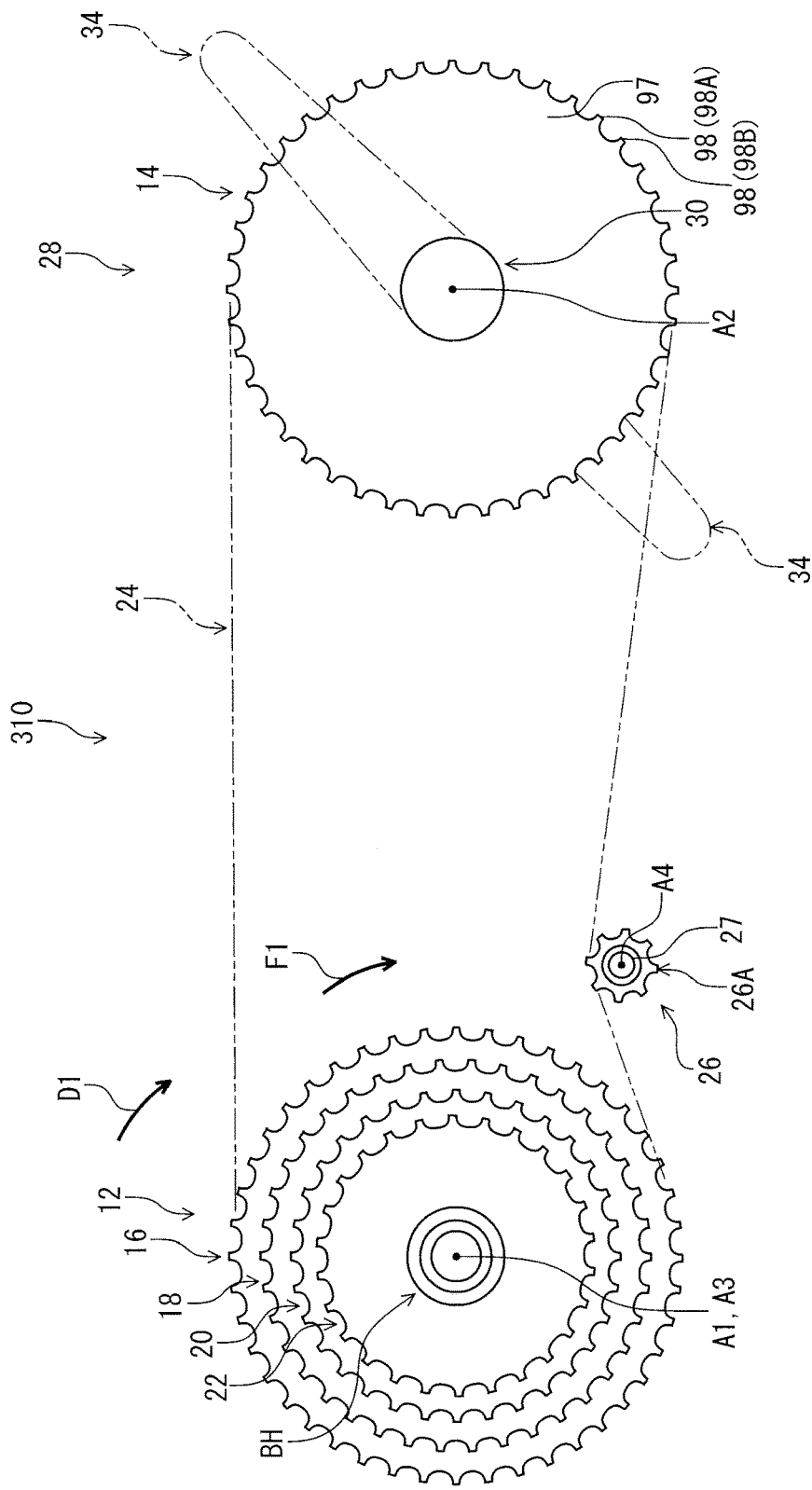
FIG. 21 is a schematic side elevational view of a bicycle drive train in accordance with a third embodiment.
Figure 22:
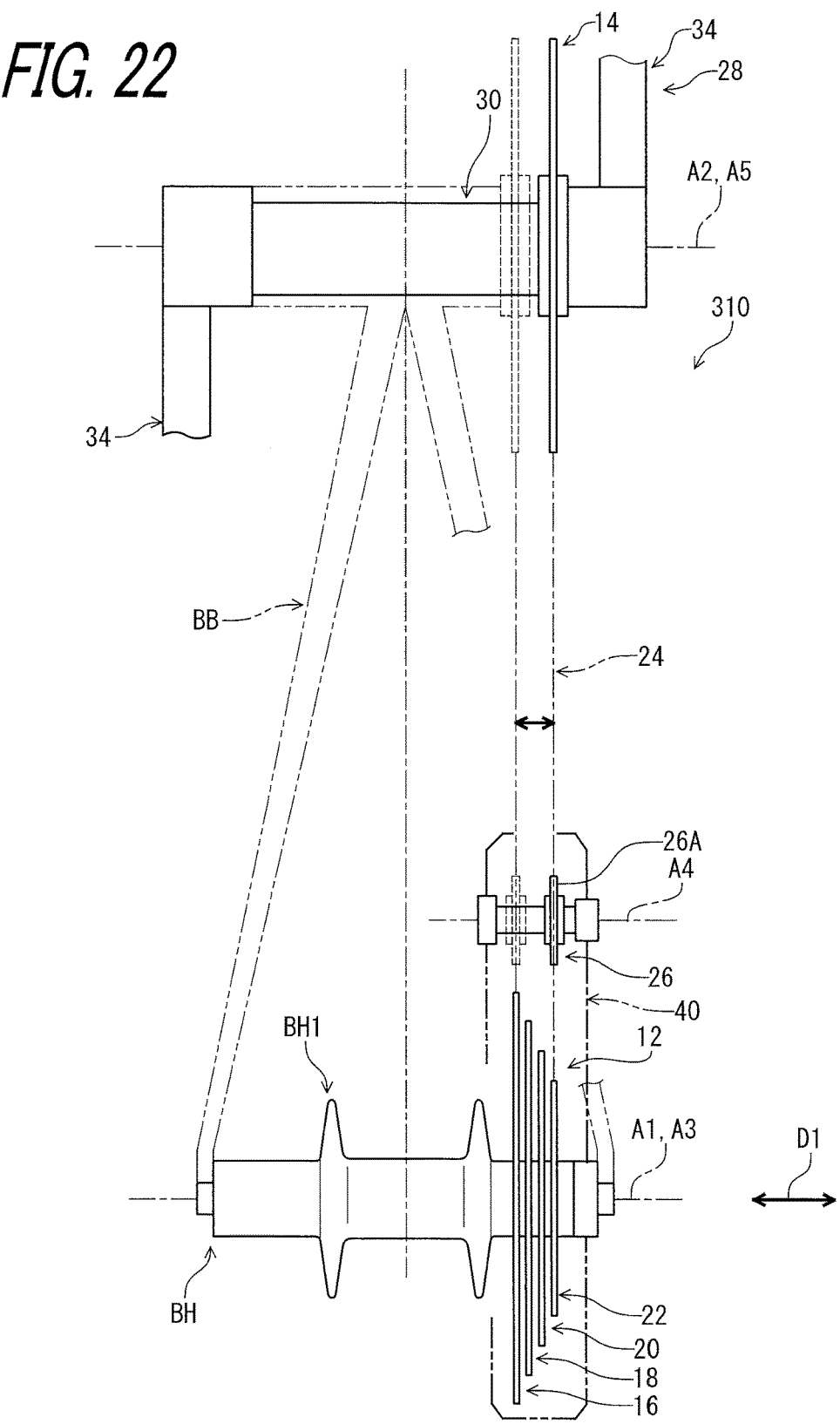
FIG. 22 is a schematic plan view of the bicycle drive train illustrated in FIG. 21.

As seen in FIGS. 21 and 22, in the bicycle drive train 310, the floating sprocket 14 is a front sprocket (a front sprocket wheel), and the sprocket assembly 12 is a rear sprocket assembly. The second chain 36 and the intermediate sprocket 34 are omitted from the bicycle drive train 310. The floating sprocket 14 is movably mounted on the crank axle 30. The floating sprocket 14 is movable relative to the sprocket assembly 12 in the axial direction D1. The second rotational center axis A2 is coincident with the front rotational center axis A5.

Fourth Embodiment

A bicycle drive train 410 in accordance with a fourth embodiment will be described below referring to FIGS. 23 and 24. The bicycle drive train 410 has the same structure and/or configuration as those of the bicycle drive train 10 except for the arrangement of the sprocket assembly 12. Thus, elements having substantially the same function as those in the above embodiments will be numbered the same here, and will not be described and/or illustrated again in detail here for the sake of brevity.

Figure 23:
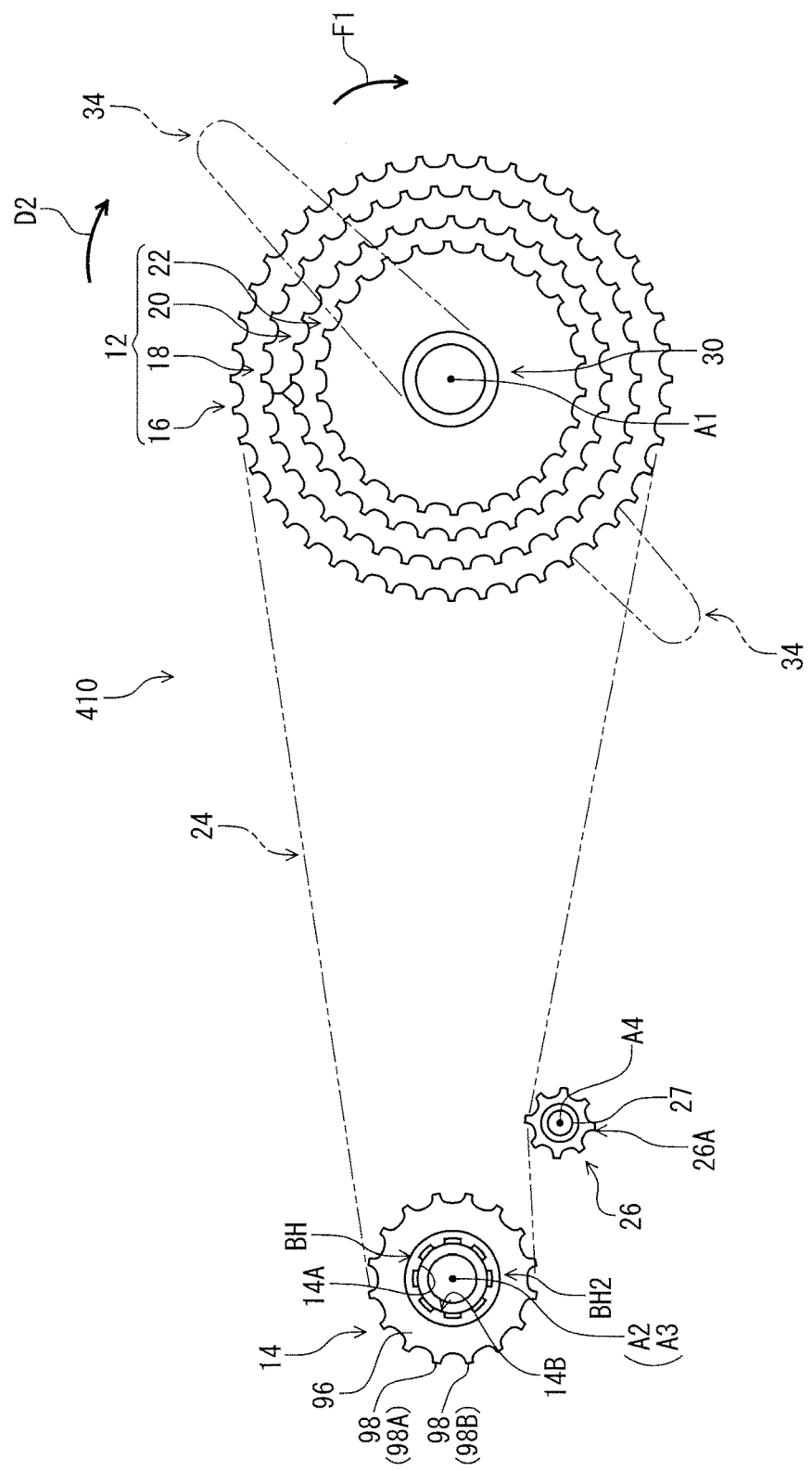
FIG. 23 is a schematic side elevational view of a bicycle drive train in accordance with a fourth embodiment.
Figure 24:
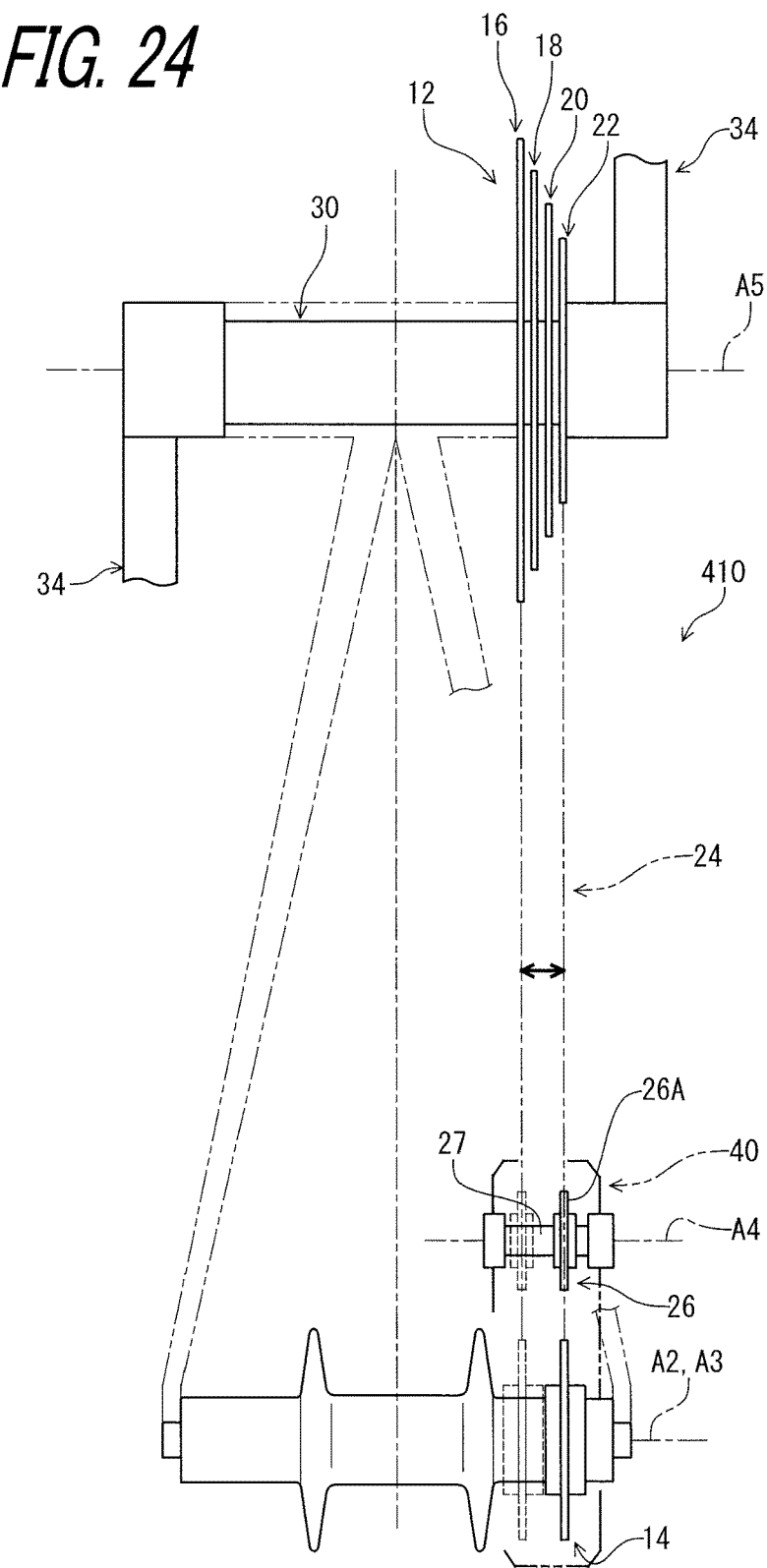
FIG. 24 is a schematic plan view of the bicycle drive train illustrated in FIG. 23.

As seen in FIGS. 23 and 24, in the bicycle drive train 410, the sprocket assembly 12 includes the crank axle 30 defining the first rotational center axis A1. The first sprocket 16 and the second sprocket 18 are mounted on the crank axle 30. The first to fourth sprockets 16 to 22 are mounted on the crank axle 30. The second chain 36 and the intermediate sprocket 34 are omitted from the bicycle drive train 410.

Fifth Embodiment

A bicycle drive train 510 in accordance with a fifth embodiment will be described below referring to FIG. 25. The bicycle drive train 510 has the same structure and/or configuration as those of the bicycle drive train 10 except for the actuator 80 and the controller 90. Thus, elements having substantially the same function as those in the above embodiments will be numbered the same here, and will not be described and/or illustrated again in detail here for the sake of brevity.

Figure 25:
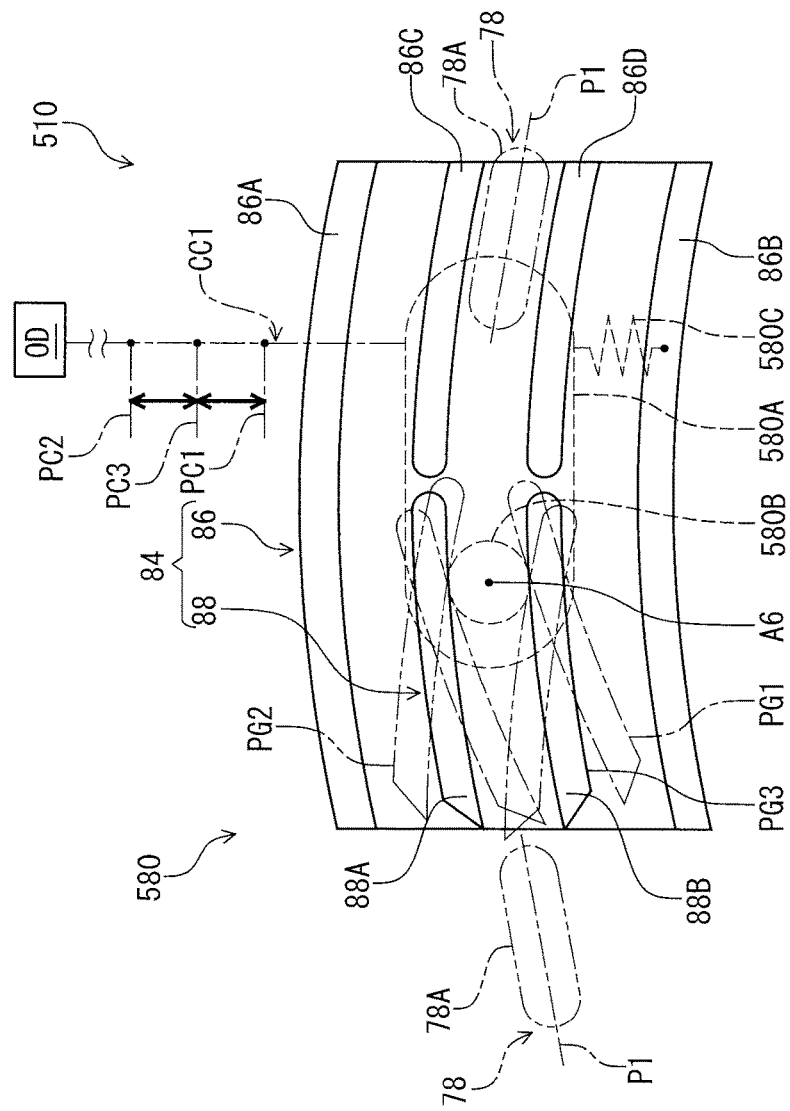
FIG. 25 is a schematic side elevational view of an actuator of a bicycle drive train in accordance with a fifth embodiment.

As seen in FIG. 25, the bicycle drive train 510 comprises an actuator 580 configured to move the first axially displaceable tooth 44 relative to the at least one first sprocket tooth 42 in response to a movement of a mechanical control cable CC1. The actuator 580 includes a cable attachment part 580A to receive movement of the mechanical control cable CC1. The controller 90 is omitted from the bicycle drive train 510.

The actuator 580 includes a pivot shaft 580B and a guide biasing member 580C. The pivot shaft 580B is rotatably coupled to the first guide 86 about the guide pivot axis A6 and is secured to the second guide 88. The cable attachment part 580A is coupled to the pivot shaft 580B to pivot along with the second guide 88 about the guide pivot axis A6 relative to the first guide 86. The mechanical control cable CC1 is coupled to the cable attachment part 580A. The guide biasing member 580C couples the cable attachment part 580A to the first guide 86 to pivot the second guide 88 toward the second guide position PG2.

The bicycle operating device OD is configured to pull and release the mechanical control cable CC1. The bicycle operating device OD is configured to position the mechanical control cable CC1 at a first cable position PC1, a second cable position PC2, and an intermediate cable position PC3 selectively in response to an operation of an operating member of the bicycle operating device OD. The first cable position corresponds to the first guide position PG1. The intermediate cable position corresponds to the intermediate guide position PG3. The second cable position corresponds to the second guide position PG2.

Sixth Embodiment

A bicycle drive train 610 in accordance with a sixth embodiment will be described below referring to FIG. 26. The bicycle drive train 610 has the same structure and/or configuration as those of the bicycle drive train 10 except for the actuator 80. Thus, elements having substantially the same function as those in the above embodiments will be numbered the same here, and will not be described and/or illustrated again in detail here for the sake of brevity.

Figure 26:
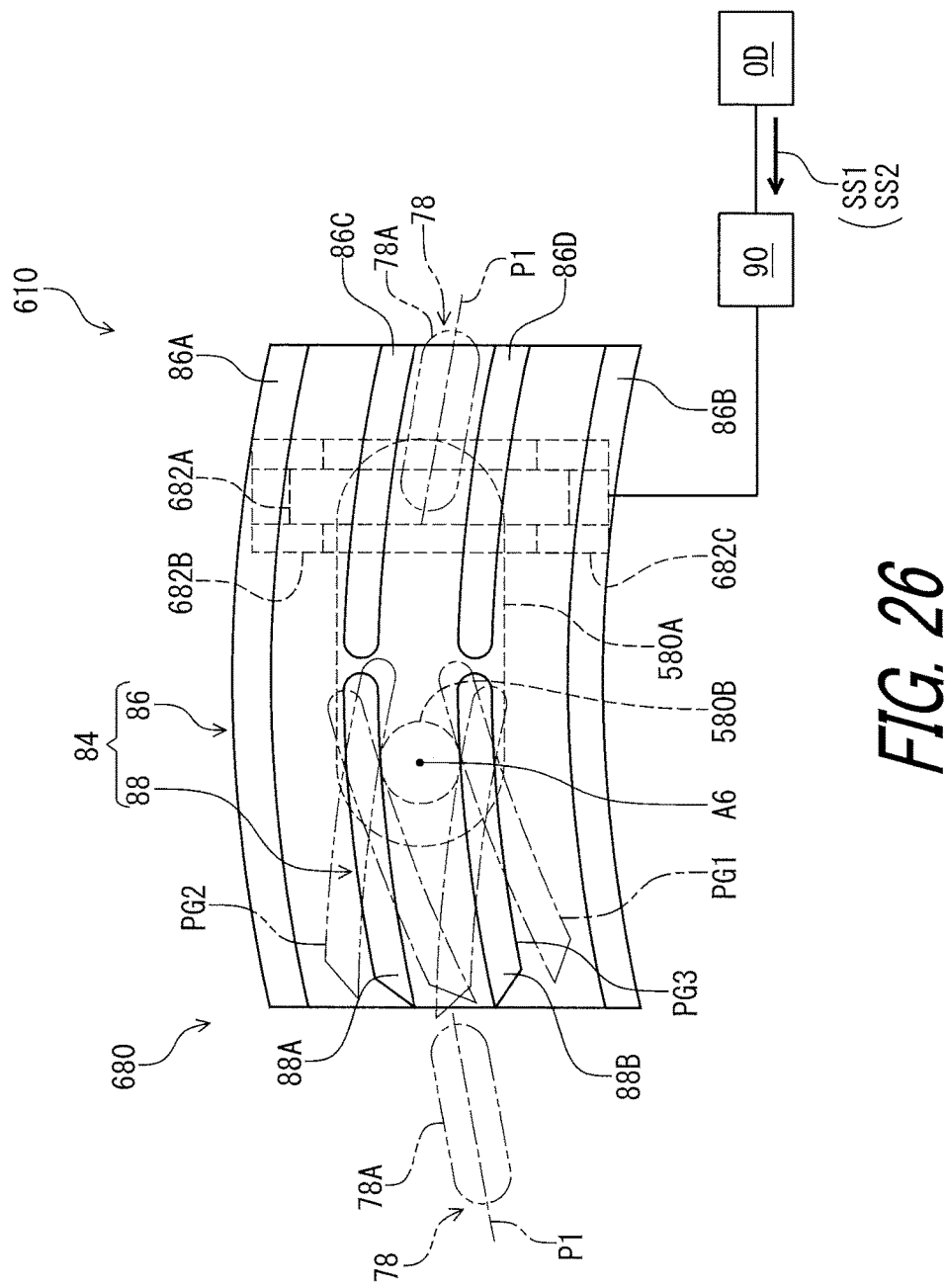
FIG. 26 is a schematic side elevational view of an actuator of a bicycle drive train in accordance with a sixth embodiment.

As seen in FIG. 26, the bicycle drive train 610 comprises an actuator 680. The actuator 680 includes a solenoid 682 configured to move the first axially displaceable tooth 44 relative to the at least one first sprocket tooth 42. The solenoid 682 includes the pivot shaft 580B, the cable attachment part 580A, a plunger 682A, a first coil 682B, and a second coil 682C. The plunger 682A is operatively coupled to the cable attachment part 580A. The plunger 682A is positioned by a solenoid biasing member (not shown) at an intermediate position corresponding to the intermediate guide position PG3 of the second guide 88. The plunger 682A is moved relative to the first guide 86 to pivot the second guide 88 to the first guide position PG1 in response to a magnetic force generated by the first coil 682B. The plunger 682A is moved relative to the first guide 86 to pivot the second guide 88 to the second guide position PG2 in response to a magnetic force generated by the second coil 682C.

The controller 90 includes a control circuit configured to control the actuator 680 to energize the first coil 680B in response to the first shift signal SS1. The control circuit is configured to control the actuator 680 to energize the second coil 680C in response to the second shift signal SS1 Since the solenoid 682 has been known in the bicycle field, it will not be described in detail here for the sake of brevity.

Modifications

Figure 27:
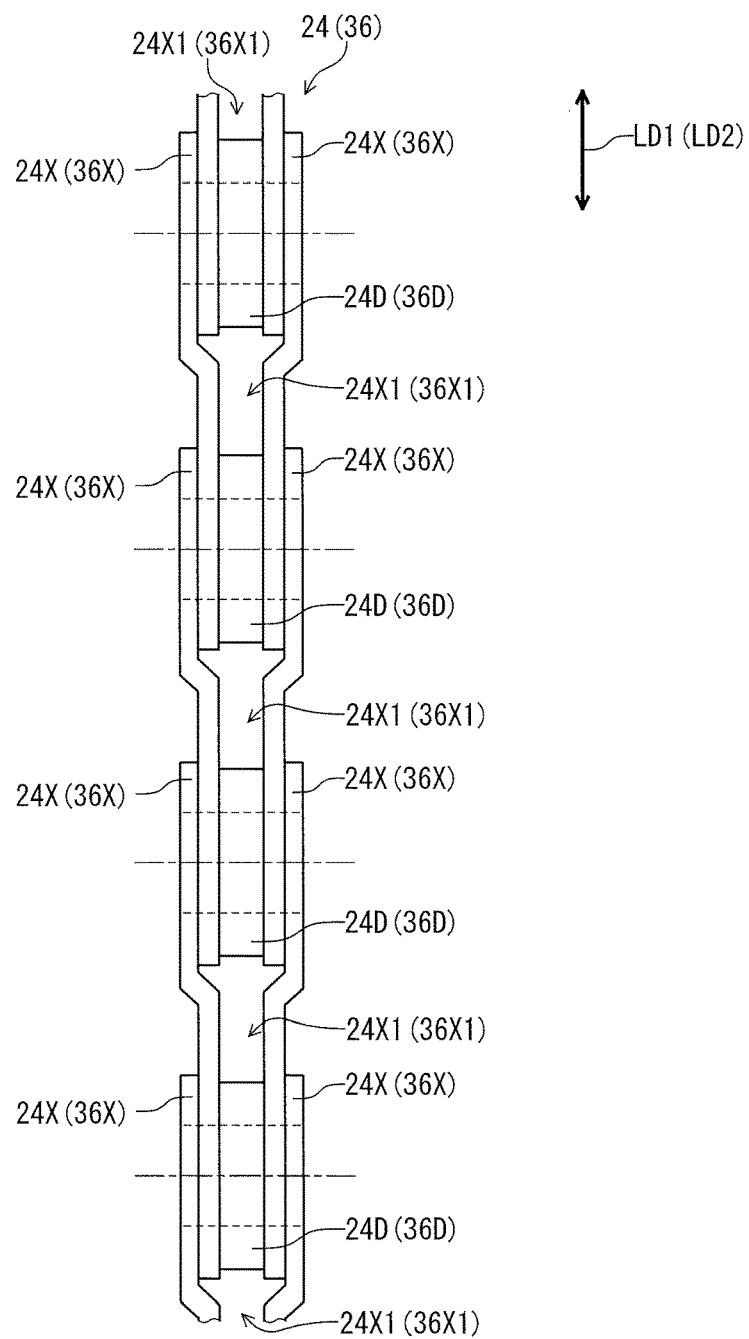
FIG. 27 is a plane view of a first chain or a second chain of a bicycle drive train in accordance with a modification.

As seen in FIG. 27, in the above embodiments, the first chain 24 can include opposed pairs of link plates 24X defining link spaces 24X1 adjacent to each other along a longitudinal direction LD1 of the first chain 24 without another space between the link spaces 24X1. The link spaces 24X1 have axial widths equal to each other. In such a modification, the first sprocket teeth 42 can have maximum widths which are defined in the axial direction D1 and which are equal to each other. The floating sprocket teeth 98 can have maximum widths which are defined in the axial direction D1 and which are equal to each other.

As seen in FIG. 27, in the above embodiments, the second chain 36 can include opposed pairs of link plates 36X defining link spaces 36X1 adjacent to each other along a longitudinal direction LD2 of the second chain 36 without another space between the link spaces 36X1. The link spaces 36X1 have axial widths equal to each other. In such a modification, the first front sprocket teeth 102 and the second front sprocket teeth 103 can have maximum widths which are defined in the axial direction D1 and which are equal to each other. The intermediate sprocket teeth 106 can have maximum widths which are defined in the axial direction D1 and which are equal to each other.

In the above embodiments, at least one of the sprockets of the bicycle drive train can be a composite sprocket.

In the above embodiments, the floating sprocket 14 can be coupled directly to a rear wheel without being mounted on the bicycle rear hub assembly BH.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle drive train comprising:
   a sprocket assembly comprising:
      a first rotational center axis;
      a first sprocket including at least one first sprocket tooth and at least one first axially displaceable tooth with respect to the first rotational center axis;
      a second sprocket including at least one second sprocket tooth, the at least one first axially displaceable tooth being displaceable relative to the at least one first sprocket tooth toward the at least one second sprocket tooth; and
      an actuator configured to move the at least one first axially displaceable tooth relative to the at least one first sprocket tooth, the actuator including a guide structure including a first guide and a second guide rotatably coupled to the first guide; and
   a floating sprocket comprising:
      a second rotational center axis offset from the first rotational center axis, one of the first rotational center axis and the second rotational center axis being coincident with a rotational center axis of a bicycle rear hub assembly in a state where the bicycle drive train is mounted to a bicycle body; and
      an axially sliding surface to support the floating sprocket movably relative to the sprocket assembly in an axial direction with respect to the second rotational center axis.

2. The bicycle drive train according to claim 1, wherein the at least one first axially displaceable tooth is pivotally displaceable about a first pivot axis relative to the at least one first sprocket tooth toward the at least one second sprocket tooth.

3. The bicycle drive train according to claim 1, wherein the actuator includes an electric motor.

4. The bicycle drive train according to claim 1, further comprising
   a chain tensioner to apply tension to a first chain coupling the sprocket assembly and the floating sprocket to transmit a rotational force between the sprocket assembly and the floating sprocket.

5. The bicycle drive train according to claim 4, wherein the chain tensioner is movable relative to the sprocket assembly in the axial direction.

6. The bicycle drive train according to claim 1, wherein the floating sprocket is a rear sprocket.

7. The bicycle drive train according to claim 1, further comprising
   a first chain coupling the sprocket assembly and the floating sprocket to transmit a rotational force between the sprocket assembly and the floating sprocket.

8. The bicycle drive train according to claim 7, wherein the first chain includes opposed pairs of link plates defining link spaces adjacent to each other along a longitudinal direction of the first chain without another space between the link spaces, and
   the link spaces have axial widths equal to each other.

9. The bicycle drive train according to claim 1, further comprising
   a housing, wherein
   the sprocket assembly and the floating sprocket are provided in the housing.

10. The bicycle drive train according to claim 1, further comprising
    a front sprocket assembly including a crank axle and a front sprocket mounted on the crank axle.

11. The bicycle drive train according to claim 10, wherein the front sprocket is a single sprocket mounted to the crank axle.

12. The bicycle drive train according to claim 11, wherein the front sprocket includes at least one first front tooth and at least one second front teeth,
    the at least one first front tooth has a first maximum axial width defined in the axial direction,
    the at least one second front tooth has a second maximum axial width defined in the axial direction, and
    the first maximum axial width is larger than the second maximum axial width.

13. The bicycle drive train according to claim 10, further comprising
    an intermediate sprocket coupled to the front sprocket with a second chain to transmit a rotational force between the intermediate sprocket and the front sprocket.

14. The bicycle drive train according to claim 13, further comprising the second chain coupling the intermediate sprocket and the front sprocket to transmit the rotational force between the intermediate sprocket and the front sprocket.

15. The bicycle drive train according to claim 13, wherein the second chain includes opposed pairs of link plates defining link spaces adjacent to each other along a longitudinal direction of the second chain without another space between the link spaces, and
the link spaces have axial widths equal to each other.

16. The bicycle drive train according to claim 13, further comprising
a one-way clutch coupling the intermediate sprocket to the first sprocket and the second sprocket such that the intermediate sprocket is rotatable relative to the first sprocket and second sprocket only in one rotational direction.

17. The bicycle drive train according to claim 1, wherein the sprocket assembly includes a crank axle defining the first rotational center axis, and
the first sprocket and the second sprocket are mounted on the crank axle.

18. The bicycle drive train according to claim 1, wherein the at least one first sprocket tooth includes at least one first wide tooth and at least one first narrow tooth,
the at least one first wide tooth has a first maximum width defined in the axial direction,
the at least one first narrow tooth has a first additional maximum width defined in the axial direction, and
the first maximum width is larger than the first additional maximum width.

19. The bicycle drive train according to claim 18, wherein the at least one second sprocket tooth includes at least one second wide tooth and at least one second narrow tooth,
the at least one second wide tooth has a second maximum width defined in the axial direction,
the at least one second narrow tooth has a second additional maximum width defined in the axial direction, and
the second maximum width is larger than the second additional maximum width.

20. The bicycle drive train according to claim 1, wherein the sprocket assembly is a rear sprocket assembly.

21. The bicycle drive train according to claim 20, further comprising
a front sprocket assembly including a crank axle and a front sprocket mounted on the crank axle.

22. The bicycle drive train according to claim 21, further comprising
an intermediate sprocket coupled to the front sprocket with a second chain to transmit a rotational force between the intermediate sprocket and the front sprocket, wherein
the intermediate sprocket is coupled to the floating sprocket rotatable about the second rotational center axis.

23. The bicycle drive train according to claim 22, further comprising
a one-way clutch coupling the intermediate sprocket to the first sprocket and the second sprocket to be rotatable relative to the first sprocket and second sprocket only in one rotational direction.

24. The bicycle drive train according to claim 1, wherein the floating sprocket is a front sprocket.

25. The bicycle drive train according to claim 24, wherein the sprocket assembly is a rear sprocket assembly.

26. The bicycle drive train according to claim 1, wherein the actuator is configured to move the first axially displaceable tooth relative to the at least one first sprocket tooth in response to a movement of a mechanical control cable, and
the actuator includes a cable attachment part to receive movement of the mechanical control cable.

27. The bicycle drive train according to claim 1, wherein the actuator includes a solenoid configured to move the first axially displaceable tooth relative to the at least one first sprocket tooth.

28. A bicycle drive train comprising:
a sprocket assembly comprising:
a first rotational center axis;
a first sprocket including at least one first sprocket tooth and at least one first axially displaceable tooth with respect to a rotational center axis of the first sprocket, the at least one first sprocket tooth including at least one first wide tooth and at least one first narrow tooth, the at least one first wide tooth having a first maximum width defined in the axial direction, the at least one first narrow tooth having a first additional maximum width defined in the axial direction, the first maximum width being larger than the first additional maximum width;
a second sprocket including at least one second sprocket tooth, the at least one first axially displaceable tooth being displaceable relative to the at least one first sprocket tooth toward the at least one second sprocket tooth; and
an actuator configured to move the at least one first axially displaceable tooth relative to the at least one first sprocket tooth, the actuator including a guide structure including a first guide and a second guide rotatably coupled to the first guide.

29. The bicycle drive train according to claim 1, wherein the sprocket assembly further comprises a link structure coupled to the at least one first axially displaceable tooth, and
the guide structure being configured to displace the at least one first axially displaceable tooth relative to the at least one first sprocket tooth by coupling with the link structure.

* * * * *